(12) United States Patent
Currier

(10) Patent No.: US 8,881,720 B2
(45) Date of Patent: Nov. 11, 2014

(54) HELIOSTAT REPOSITIONING SYSTEM AND METHOD

(75) Inventor: Thomas Currier, Rochester, MN (US)

(73) Assignee: QBotix, Inc., Menlo Park, CA (US)

( * ) Notice: Subject to any disclaimer, the term of this patent is extended or adjusted under 35 U.S.C. 154(b) by 303 days.

(21) Appl. No.: 13/118,274

(22) Filed: May 27, 2011

(65) Prior Publication Data

US 2011/0240007 A1    Oct. 6, 2011

Related U.S. Application Data

(60) Provisional application No. 61/349,697, filed on May 28, 2010, provisional application No. 61/364,729, filed on Jul. 15, 2010, provisional application No. 61/419,685, filed on Dec. 3, 2010.

(51) Int. Cl.
*F24J 2/38* (2006.01)
*F24J 2/40* (2006.01)
*F24J 2/54* (2006.01)

(52) U.S. Cl.
CPC .. *F24J 2/542* (2013.01); *F24J 2/40* (2013.01); *F24J 2002/385* (2013.01); *F24J 2002/5462* (2013.01); *Y02E 10/47* (2013.01)
USPC ............ 126/607; 126/576; 126/600; 126/601

(58) Field of Classification Search
CPC . Y02E 10/47; F24J 2002/5465; G01S 3/7861
USPC .................. 126/576, 600, 601, 607
See application file for complete search history.

(56) References Cited

U.S. PATENT DOCUMENTS

| | | | |
|---|---|---|---|
| 450,257 | A | 4/1891 | Schilling |
| 1,745,714 | A | 2/1930 | Reynolds et al. |
| 2,568,995 | A | 9/1951 | Eckhardt |
| 3,198,139 | A | 8/1965 | Dark |
| 3,220,295 | A | 11/1965 | Griffin |

(Continued)

FOREIGN PATENT DOCUMENTS

| | | |
|---|---|---|
| CN | 1589384 A | 3/2005 |
| CN | 101010545 A | 8/2007 |

(Continued)

OTHER PUBLICATIONS

Mack, M., "Yield Study s:wheel location Almansa/Spain," by order of RWenergy GmbH, Solar Engineering Decker & Mack GmbH, Jul. 2008, 11 pages.

(Continued)

*Primary Examiner* — Kenneth Rinehart
*Assistant Examiner* — Gajanan M Prabhu
(74) *Attorney, Agent, or Firm* — Fenwick & West LLP

(57) ABSTRACT

A system and method for providing real time control of a heliostat array or CPV/PV module that reduces actuation cost, the disclosure reduces the fixed cost of calibrating and repositioning an individual surface. This simultaneously removes the core engineering assumption that drives the development of large trackers, and enables a system and method to cost effectively track a small surface. In addition to lower initial capital cost, a small heliostat or solar tracker can be pre-assembled, mass-produced, and shipped more easily. Smaller mechanisms can also be installed with simple hand tools and do not require installers to rent expensive cranes or installation equipment.

21 Claims, 20 Drawing Sheets

(56) References Cited

U.S. PATENT DOCUMENTS

| | | | |
|---|---|---|---|
| 3,227,929 A | 1/1966 | McCreight | |
| 3,286,651 A | 11/1966 | Dahl, Jr. | |
| 3,319,581 A | 5/1967 | Churchman et al. | |
| 3,335,490 A | 8/1967 | Warner | |
| 3,625,158 A | 12/1971 | Lorenz et al. | |
| 3,747,966 A | 7/1973 | Wilkes et al. | |
| 3,780,966 A | 12/1973 | Newcomb, Jr. et al. | |
| 3,865,040 A | 2/1975 | Steen | |
| 3,890,904 A | 6/1975 | Edwards | |
| 3,935,822 A | 2/1976 | Kaufmann | |
| 3,985,081 A | 10/1976 | Sullivan, II | |
| 3,996,460 A | 12/1976 | Smith | |
| 4,000,702 A | 1/1977 | Mackintosh | |
| 4,041,307 A | 8/1977 | Napoli et al. | |
| 4,044,688 A | 8/1977 | Kita | |
| 4,145,481 A | 3/1979 | Gupta et al. | |
| 4,179,612 A | 12/1979 | Smith | |
| 4,185,562 A | 1/1980 | Hatori et al. | |
| 4,203,426 A | 5/1980 | Matlock et al. | |
| 4,225,781 A | 9/1980 | Hammons | |
| 4,289,414 A | 9/1981 | Recker | |
| 4,290,411 A | 9/1981 | Russell | |
| 4,355,630 A * | 10/1982 | Fattor | 126/576 |
| 4,404,465 A | 9/1983 | Miller | |
| 4,484,565 A | 11/1984 | Mori | |
| 4,495,408 A | 1/1985 | Mori | |
| 4,509,501 A | 4/1985 | Hunter | |
| 4,513,087 A | 4/1985 | Giuliani et al. | |
| 4,690,064 A | 9/1987 | Owen | |
| 4,832,002 A | 5/1989 | Medina | |
| 4,910,395 A | 3/1990 | Frankel | |
| 4,931,949 A | 6/1990 | Hernandez et al. | |
| 4,996,928 A | 3/1991 | Janssen et al. | |
| 5,052,804 A | 10/1991 | Martin | |
| 5,069,141 A | 12/1991 | Ohara et al. | |
| 5,144,498 A | 9/1992 | Vincent | |
| 5,279,477 A | 1/1994 | Yoshikawa | |
| 5,372,072 A | 12/1994 | Hamy | |
| 5,479,862 A | 1/1996 | Waterkamp | |
| 5,497,581 A | 3/1996 | Williams | |
| 5,787,878 A | 8/1998 | Ratliff, Jr. | |
| 5,819,189 A | 10/1998 | Kramer et al. | |
| 5,934,198 A | 8/1999 | Fraser | |
| 6,318,657 B1 | 11/2001 | Nayak | |
| 6,321,657 B1 | 11/2001 | Owen | |
| 6,446,560 B1 | 9/2002 | Slocum | |
| 6,523,481 B2 | 2/2003 | Hara et al. | |
| 6,676,363 B1 | 1/2004 | Solignac | |
| 6,736,086 B2 | 5/2004 | Kaiser et al. | |
| 6,959,993 B2 * | 11/2005 | Gross et al. | 359/853 |
| 7,000,608 B2 | 2/2006 | Loschmann | |
| 7,036,644 B2 | 5/2006 | Stevenson et al. | |
| 7,192,146 B2 | 3/2007 | Gross et al. | |
| 7,235,765 B2 | 6/2007 | Clugston, Jr. | |
| 7,252,083 B2 | 8/2007 | Hayden | |
| 7,341,004 B2 | 3/2008 | Sullivan, II | |
| 7,380,507 B2 | 6/2008 | Sullivan, II | |
| 7,380,549 B1 | 6/2008 | Ratliff | |
| 7,507,941 B2 | 3/2009 | Yeh et al. | |
| 7,650,843 B2 | 1/2010 | Minges | |
| 7,823,512 B2 | 11/2010 | Timan et al. | |
| 8,104,893 B2 | 1/2012 | Reznik et al. | |
| 8,115,151 B2 | 2/2012 | Wang | |
| 8,121,729 B2 | 2/2012 | Blanc et al. | |
| 8,122,878 B1 | 2/2012 | Gross et al. | |
| 8,160,746 B2 | 4/2012 | Wang et al. | |
| 8,285,417 B2 | 10/2012 | Kawaguchi et al. | |
| 8,295,978 B2 | 10/2012 | Cho et al. | |
| 8,316,840 B2 * | 11/2012 | Karim et al. | 126/581 |
| 8,381,501 B2 * | 2/2013 | Koselka et al. | 56/10.2 A |
| 2003/0051750 A1 | 3/2003 | Lawheed | |
| 2003/0060927 A1 | 3/2003 | Gerbi et al. | |
| 2003/0208302 A1 | 11/2003 | Lemelson et al. | |
| 2004/0098167 A1 | 5/2004 | Yi et al. | |
| 2004/0129380 A1 | 7/2004 | Murphy et al. | |
| 2004/0196587 A1 | 10/2004 | Gupta et al. | |
| 2004/0202062 A1 | 10/2004 | Ostwald et al. | |
| 2005/0139113 A1 | 6/2005 | Kling | |
| 2006/0213387 A1 | 9/2006 | Sullivan, II | |
| 2006/0271263 A1 | 11/2006 | Self et al. | |
| 2007/0150104 A1 | 6/2007 | Jang et al. | |
| 2008/0011288 A1 | 1/2008 | Olsson | |
| 2008/0017784 A1 | 1/2008 | Hoot et al. | |
| 2008/0251115 A1 | 10/2008 | Thompson et al. | |
| 2008/0257398 A1 | 10/2008 | Laing et al. | |
| 2008/0308094 A1 | 12/2008 | Johnston | |
| 2009/0060739 A1 | 3/2009 | Robinson | |
| 2009/0165841 A1 | 7/2009 | Gunn, Jr. et al. | |
| 2009/0249787 A1 | 10/2009 | Pfahl et al. | |
| 2009/0320827 A1 | 12/2009 | Thompson et al. | |
| 2010/0000518 A1 | 1/2010 | Chen et al. | |
| 2010/0004087 A1 | 1/2010 | Minegishi et al. | |
| 2010/0031952 A1 | 2/2010 | Zavodny et al. | |
| 2010/0082171 A1 | 4/2010 | Takehara et al. | |
| 2010/0095954 A1 | 4/2010 | Huang et al. | |
| 2010/0131103 A1 | 5/2010 | Herzog et al. | |
| 2010/0139644 A1 | 6/2010 | Schwarzbach et al. | |
| 2010/0206294 A1 * | 8/2010 | Blair et al. | 126/600 |
| 2010/0212654 A1 | 8/2010 | Trevijano | |
| 2010/0218430 A1 | 9/2010 | Baines et al. | |
| 2010/0241260 A1 | 9/2010 | Kilibarda et al. | |
| 2011/0000478 A1 | 1/2011 | Reznik | |
| 2011/0041669 A1 | 2/2011 | Hermanson et al. | |
| 2011/0071676 A1 | 3/2011 | Sanders et al. | |
| 2011/0079266 A1 | 4/2011 | Pan | |
| 2011/0137458 A1 | 6/2011 | Hisatani et al. | |
| 2011/0209696 A1 | 9/2011 | O'Rourke | |
| 2011/0240007 A1 | 10/2011 | Currier | |
| 2011/0288684 A1 | 11/2011 | Farlow et al. | |
| 2011/0294096 A1 | 12/2011 | deCastro et al. | |
| 2012/0012101 A1 | 1/2012 | Trujillo et al. | |
| 2012/0123720 A1 | 5/2012 | Fukuba et al. | |
| 2012/0152877 A1 | 6/2012 | Tadayon | |
| 2012/0165978 A1 | 6/2012 | Li et al. | |
| 2012/0199266 A1 | 8/2012 | Potter et al. | |
| 2013/0238271 A1 | 9/2013 | Fukuba et al. | |

FOREIGN PATENT DOCUMENTS

| | | | |
|---|---|---|---|
| CN | 101504202 A | 8/2009 | |
| EP | 1 306 991 A1 | 5/2003 | |
| WO | WO 2010/073860 A1 | 7/2010 | |
| WO | WO 2011/158199 A2 | 12/2011 | |

OTHER PUBLICATIONS

PCT International Search Report and Written Opinion, PCT Application No. PCT/US11/43905, Dec. 16, 2011, 12 pages.

PCT International Search Report, PCT Application No. PCT/US11/63144, Apr. 25, 2012, 13 pages.

PCT International Search Report and Written Opinion, PCT Application No. PCT/US11/38412, Oct. 3, 2011, 14 pages.

Inman, D.J., "Modeling and Control of Intelligent Flexible Structures," Final Technical Report, AD-A280 478, sponsored by AFOSR/NA, Mar. 1994, 224 pages.

Yim, M. et al., "Modular Self-Reconfigurable Robot Systems", IEEE Robotics & Automation Magazine, Mar. 2007, pp. 43-52.

Yoon, Y., "Modular Robots for Making and Climbing 3-D Trusses", Master's Thesis, submitted on May 12, 2006 at Massachusetts Institute of Technology, 143 pages.

Choy, F.K. et al., "Quantification of Gear Tooth Damage by Optimal Tracking of Vibration Signatures," International Journal of Rotating Machinery, 1997, pp. 143-151, vol. 3, No. 3.

Forrest, J.A., "Measured Dynamics of a Thin Cylindrical Shell Subject to Axial Excitation," Proceedings of Acoustics, Australia, Nov. 2005, pp. 61-66.

Kamei, K. et al., "Cloud Networked Robotics," IEEE Network, May/Jun. 2012, pp. 28-34, vol. 23 Issue 3.

(56) References Cited

OTHER PUBLICATIONS

Koga, Tetsuzo, "Free Vibrations of Circlular Cylindrical Shells", Http://Www.Geocities.Co.Jp/Siliconvalley-Bay/1245, p. 1-20, 2008.
Kokossalakis, G., "Acoustic Data Communication System for In-Pipe Wireless Sensor Networks," Thesis, Massachusetts Institute of Technology, Dept of Civil and Environmental Engineering, Feb. 2006, 294 pages.
Li, S-R. et al., "Free Vibration of Three-Layer Circular Cylindrical Shells with Functionally Graded Middle layer," Mechanics Research Communications, Elsevier, 2010, pp. 577-580, vol. 37.
Polastre et al., "Loud: An Immersive Music Exploration System," Technical Report, 2002, University of California, Berkeley, 4 pages.
Ramamurti et al., "Free Vibrations of Circular Cylindrical Shells," Journal of Sound and Vibration, Sep. 1976, pp. 137-155, vol. 48, Issue 1.
Vold, H. et al., "Multi Axle Order Tracking with the Vold-Kalman Tracking Filter," Sound and Vibration, May 1997, pp. 30-34.
United States Office Action, U.S. Appl. No. 13/182,297, Oct. 2, 2013, 21 pages.
Chinese First Office Action, Chinese Application No. 201180036825.3, Jun. 30, 2014, 12 pages.
Australian First Office Action, Australian Application No. 2011258022, Aug. 18, 2014, 3 pages.
Australian First Office Action, Australian Application No. 2011279154, Aug. 19, 2014, 3 pages.

\* cited by examiner

HELIOSTAT REPOSITIONING SYSTEM AND METHOD

RELATED APPLICATIONS

This application claims priority from U.S. provisional application No. 61/349,697 filed on May 28, 2010, and U.S. provisional application No. 61/364,729 filed on Jul. 15, 2010, and U.S. provisional application No. 61/419,685 filed on Dec. 3, 2010, which are all incorporated by reference herein in their entirety.

FIELD OF THE INVENTION

The present invention relates to solar tracking and calibration devices, and in particular a concentrated photovoltaic tracking systems that require constant repositioning to maintain alignment with the sun.

BACKGROUND OF THE INVENTION

In an attempt to reduce the price of solar energy, many developments have been made with respect to lowering the cost of precisely repositioning and calibrating a surface with two degrees of freedom. In concentrated solar thermal systems, heliostat arrays utilize dual axis repositioning mechanisms to redirect sunlight to a central tower by making the normal vector of the heliostat mirror bisect the angle between the current sun position and the target. Heat generated from the central tower can then be used to generate steam for industrial applications or electricity for the utility grid.

Concentrated photovoltaic (CPV) systems take advantage of dual axis mechanisms in order to achieve a position where the vector normal to the CPV surface is coincident with the solar position vector. When the CPV surface is aligned to the sun, internal optics are able to concentrate sunlight to a small, high efficiency photovoltaic cell.

Dual axis positioning systems also enable flat plate photovoltaic (PV) systems to produce more power through solar tracking. Compared to fixed tilt systems, dual axis PV systems produce 35-40% more energy on an annualized basis. While this increase in energy production may seem attractive, current technology marginalizes the value of biaxial solar tracking by increasing total system capital and maintenance costs by 40-50%.

Traditional solutions to the problem of controlling and calibrating an individual surface fall into one of three main categories: active individual actuation, module or mirror ganging, and passive control. In the active individual actuation model, each dual axis system requires two motors, a microprocessor, a backup power supply, field wiring, and an electronic system to control and calibrate each surface. Moreover, all components must carry a 20+ year lifetime and the system needs to be sealed from the harsh installation environment. In an attempt to spread out the fixed cost of controlling an individual surface, conventional engineers' thinking within the individual actuation paradigm are building 150 square meters (m^2) heliostats and 225 square meters PV/CPV trackers. While control costs are reduced at this size, large trackers suffer from increased steel, foundational, and installation requirements.

Another approach attempts to solve the fixed controls cost problem by ganging together multiple surfaces with a cable or mechanical linkage. While this effectively spreads out motor actuation costs, it places strict requirements on land grading, greatly complicates the installation process, and incurs a larger steel cost due to the necessary stiffness of the mechanical linkages. Due to constant ground settling and imperfections in manufacturing and installation, heliostat and CPV systems require individual adjustments that increase system complexity and maintenance cost.

Passive systems utilizing hydraulic fluids, bimetallic strips, or bio-inspired materials to track the sun are limited to flat plate photovoltaic applications and underperform when compared to individually actuated or ganged systems. Moreover, these systems are unable to execute backtracking algorithms that optimize solar fields for energy yield and ground coverage ratio.

SUMMARY

It is a general object of some embodiments to provide a low cost solar tracking system that is able to precisely control and calibrate a surface with two degrees of freedom without an individual microprocessor, azimuth drive, elevation drive, central control system, or backup power supply. These components are replaced by a mechanical position locking mechanism with adjustable orientation and a single robotic controller that adjusts a large row (100+) of individual mirrors, CPV modules, or flat plate solar panels autonomously.

It is a second general object of some embodiments to eliminate the need for individual solar calibration sensors by coupling a calibration sensor system with the robotic controller so that this device can determine the precise orientation of the a mirror, CPV module, or solar panel and adjust it according to the field layout, a known target, and/or current sun position.

It is a third general object of some embodiments to lock the position of the mechanical position locking mechanism at times when a robotic controller is not repositioning it. At its minimum level of complexity, the mechanical position locking mechanism consists of a single deformable linkage or a joint with high friction.

It is a fourth general object of some embodiments to utilize a gear or gear train system in the mechanical position locking mechanism to transform the rotational repositioning of two input shafts into two degrees of surface freedom. The orientation of the surface can be locked through the use of an external braking system or by designing the gear or gear train system such that it cannot be back driven.

It is a fifth general object of some embodiments to adjust individual mechanical position locking mechanisms using a magnetic or electromagnetic interface that eliminates the need for the robotic controller to directly contact the mechanical interface supporting the precisely controlled surface.

It is a sixth general object of some embodiments to substantially reduce the cost and complexity of installation by preassembling rows of position locking mechanisms, and by using pole foundations to eliminate the need to level the installation field.

It is a seventh general object of some embodiments to provide power to the robotic controller utilizing an onboard energy storage system in conjunction with a charging mechanism.

It is an eighth general object of some embodiments to provide power to the robotic controller utilizing an electrified rail or tethered wire system that eliminates the need for onboard energy storage.

It is an ninth general object of some embodiments to utilize this heliostat repositioning system in conjunction with central receivers for solar thermal power, central photovoltaic receivers, central receivers for water desalination and industrial steam applications, or to cost effectively track a CPV module or PV panel.

A system for controlling multiple solar surfaces comprising a support beam or track; a first solar surface of the multiple solar surfaces coupled to a first end of a first support structure, wherein a second end of said first support structure is coupled to a first position of the track beam and said first support structure includes a first position locking mechanism; a second solar surface of the multiple solar surfaces coupled to a first end of a second support structure, wherein a second end of said second support structure is coupled to a second position of the track and said second support structure includes a second position locking mechanism; and a robotic controller, including drive system for positioning said robotic controller on the track and to modify the direction of the first solar surface when said robotic controller is positioned near said first position of the track, and to modify the direction of the second solar surface when the robotic controller is positioned near the second position of said track.

The listing of these general objects of the invention is not exhaustive and is not intended to limit the scope of the present invention.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

Figure 1:
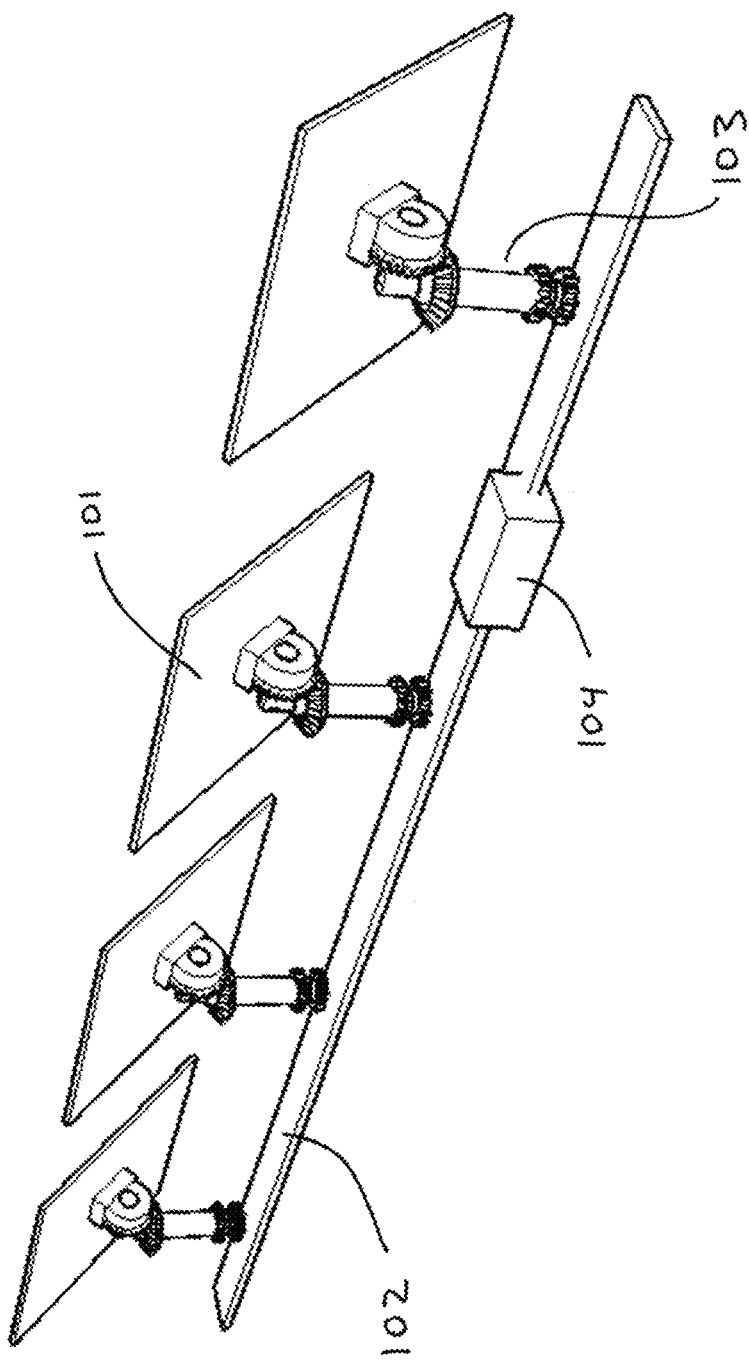
FIG. 1 is an illustration of an environment in which an embodiment of the invention can operate.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

Building upon the realization that real time control of a heliostat array or CPV/PV module incurs wasted actuation cost, embodiments of the present invention attempt to eliminate the fixed cost of calibrating and repositioning an individual surface. This simultaneously removes the core engineering assumption that drives the development of large trackers, and enables the present invention to cost effectively track a small surface. In addition to lower initial capital cost, a small heliostat or solar tracker can be pre-assembled, mass-produced, and shipped more easily. Smaller mechanisms can also be installed with simple hand tools and do not require installers to rent expensive cranes or installation equipment.

Referring now to the drawings, FIGS. 1-6 show one configuration for a preassembled row of mechanical position locking mechanisms that are able to maintain the position of individual surfaces with two degrees of freedom. These surfaces, e.g., solar surfaces, could be curved mirrors, flat mirrors, photovoltaic (PV) modules which can include concentrated photovoltaic (CPV) modules, or flat plate solar panels. For ease of discussion, these surfaces will be referred to as PV surfaces.

FIG. 1 is an illustration of an environment in which an embodiment of the invention can operate. FIG. 1 depicts a possible permutation of the design wherein the orientation of individual surfaces (101) with respect to a rigid support beam (102) (also referred to herein as a "track") is adjustable. This support beam can be made out of steel, aluminum, plastic, fiberglass or a material that can provide sufficient rigidity to support a solar surface. This figure shows that each surface is attached to the beam via a mechanical position locking mechanism (103). In one embodiment, an independent robotic controller (104) moves along the rigid support beam and interfaces with individual mechanical position locking mechanisms to adjust the two-axis orientation of distinct surfaces. The robotic controller paradigm leverages the fact that the solar position vector moves by only 15 degrees per hour and is thus able to minimize its cost by adjusting a multiplicity of surfaces. Essentially, better robotics—not lower motor, controller, power supply, or wiring costs—will enable more attractive system economics as the device can be continually updated to move faster between stations, make adjustments more quickly, and carry a longer lifetime.

In an alternate embodiment, the rigid support beam's (track's) only functional duty is to transport the robotic controller between solar surfaces. In this embodiment, each mechanical position locking mechanism has an individual foundation. The rigid support beam thus serves as a lightweight track that may be made out of plastic, e.g., polyvinyl chloride (PVC) tubing, fiberglass aluminum, steel, or any material able to support the weight of the robotic controller. The track may be placed adjacent to a multiplicity of mechanical position locking mechanisms. The track may also be flexible to allow for installation tolerances for the individual foundations supporting each mechanical position locking mechanism. Utilizing the rigid support beam as a non-structural member is preferable for photovoltaic applications where a larger amount of spacing is required between solar surfaces.

Figure 2:
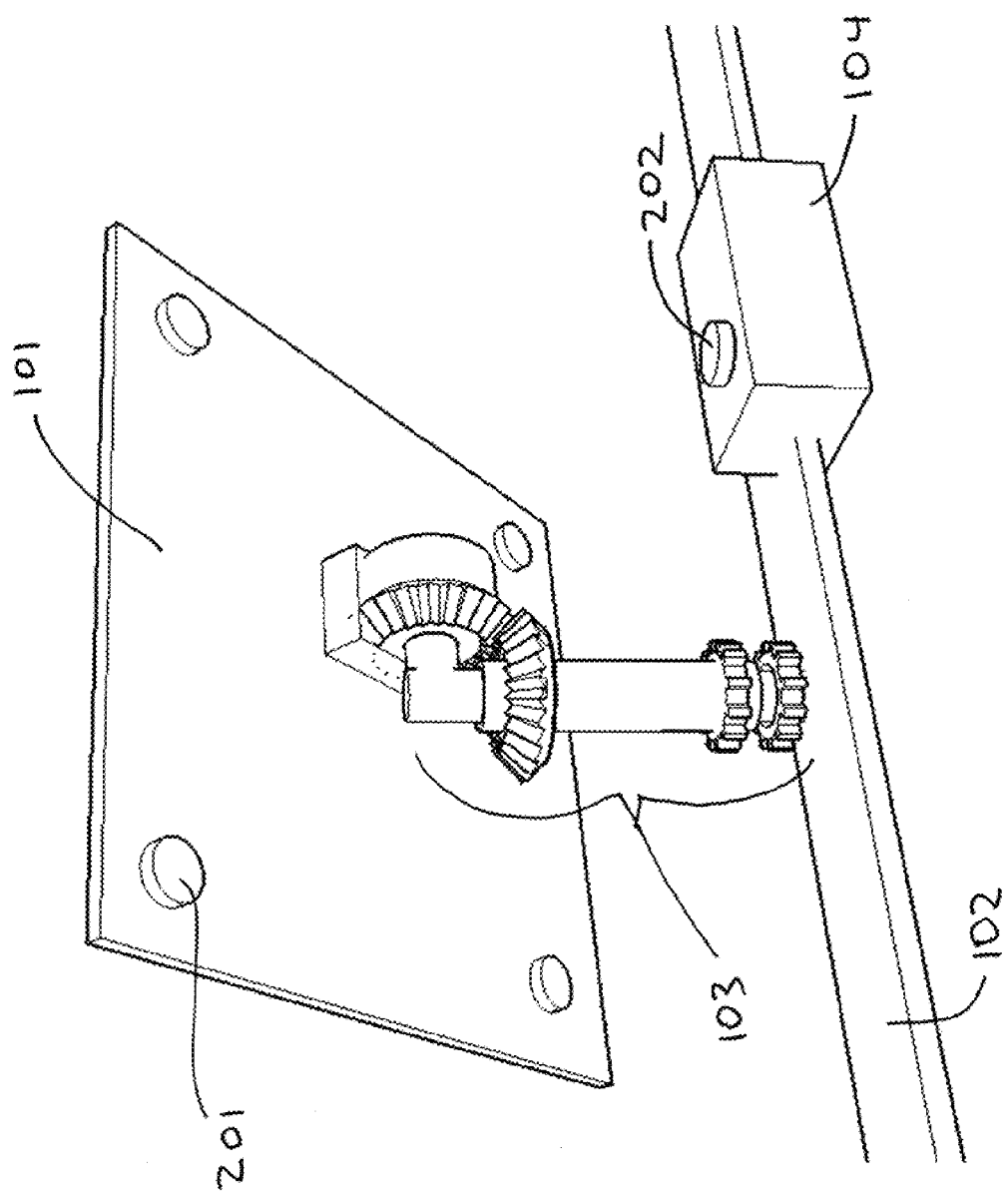
FIG. 2 is an illustration of a photovoltaic (PV) surface having a mechanical position locking mechanism in accordance with an embodiment.

FIG. 2 is an illustration of a photovoltaic (PV) surface having a mechanical position locking mechanism in accordance with an embodiment. FIG. 2 shows that a surface (101) is attached to the mechanical position locking mechanism (103), and that this mechanism is attached to the beam (102). This figure also shows a multiplicity of calibration points (201) on the repositionable surface. The general purpose of these points is to enable the robotic controller (104) to sense the orientation of the surface by determining the distance from its calibration sensor or sensors (202) to a multiplicity of calibration points. The robotic controller may then use an onboard computer to fit these discovered position of these points to a geometric plane. These calibration points can be virtual nodes generated by the robotic controller or physical markers on the surface. Also note that these points are mostly for visualization purposes and it is not necessary to have physical calibration points. In one embodiment, the robotic controller's calibration system consists of a structured light emission device and a collocated camera able to detect structured light. An onboard image-processing unit uses triangulation of detected features to determine depth from the camera. A depth map is then created that fits the detected features to a geometric plane. The kinematics of aforementioned plane determines relative orientation.

Figure 3:
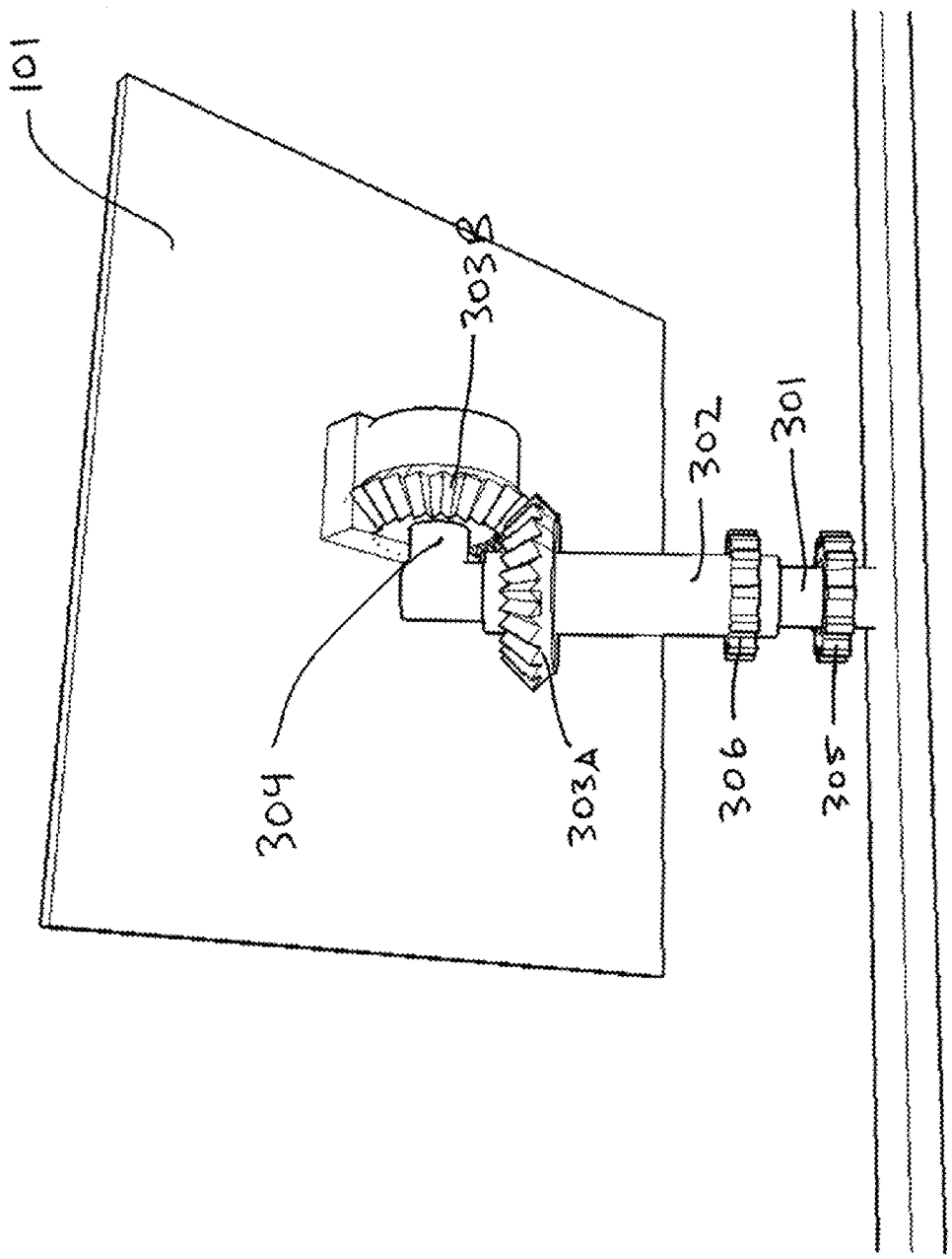
FIG. 3 is a more detailed illustration of the mechanical position locking mechanism in accordance with an embodiment.

FIG. 3 is a more detailed illustration of the mechanical position locking mechanism in accordance with an embodiment. FIG. 3 is a close up view of the mechanical position locking mechanism. This mechanism may be composed of a gear train that controls the orientation of a surface with two degrees of freedom. It contains an inner linking structure (301), an outer tubular linking structure (302) that envelops the inner linkage, and a right angle gearbox (303A, 303B) mounted to a shaft (304) fixed to the inner tubular linking structure. In the system's most basic functional form, a single gear is fixed to the inner linking structure (305). Rotation of this gear directly adjusts the azimuthal orientation of the surface (101).

An additional gear (306) is fixed to the outer tubular linkage. Rotation of this gear adjusts the position of the input gear (303A) of the right angle gearbox. The shaft (304) of the output gear (303B) in the right angle gearbox is fixed to the inner linking structure. The gear fixed to the inner linkage (305) is thus able to control the azimuthal orientation of the surface, and the gear fixed to the outer linkage (306) is able to control the elevation—or tilt—of the repositionable surface. The right angle gearbox (303A, 303B) may utilize a bevel, miter, face, magnetic, or worm gear system. Similarly, the gears fixed to the inner and outer linkages (305, 306) could be a part of a spur, miter, bevel, worm, face, harmonic, magnetic, or helical gear system or gear train. These gears may serve as an interface for the robotic controller, but are not necessary from a functionality standpoint. As an example, the robotic controller could engage the inner and outer linkages (301, 302) and rotate them directly.

The high level purpose of the gear train system is to translate the rotation of two input linkages—with fixed rotation axes—into two-axis control of the surface. This mechanism greatly reduces the complexity of the robotic controller as both input linkages remain in the same position during adjustment. The constraint that both input linkages must have a fixed rotation axes can be removed in order to reduce the complexity of the mechanical position locking mechanism. In these systems, the robotic controller would need to compensate for input linkages that do not remain in the same position during adjustment.

Taking the present invention's distributed actuation paradigm to an extreme, the mechanical position locking mechanism could consist of a single lockable or flexible joint that is fixed to the repositionable surface. In this class of solutions, the robot would be need to be able to unlock this joint, adjust the surface using an onboard actuation system that may contact the surface directly, and lock the joint before moving to another mechanical position locking mechanism.

Figure 4:
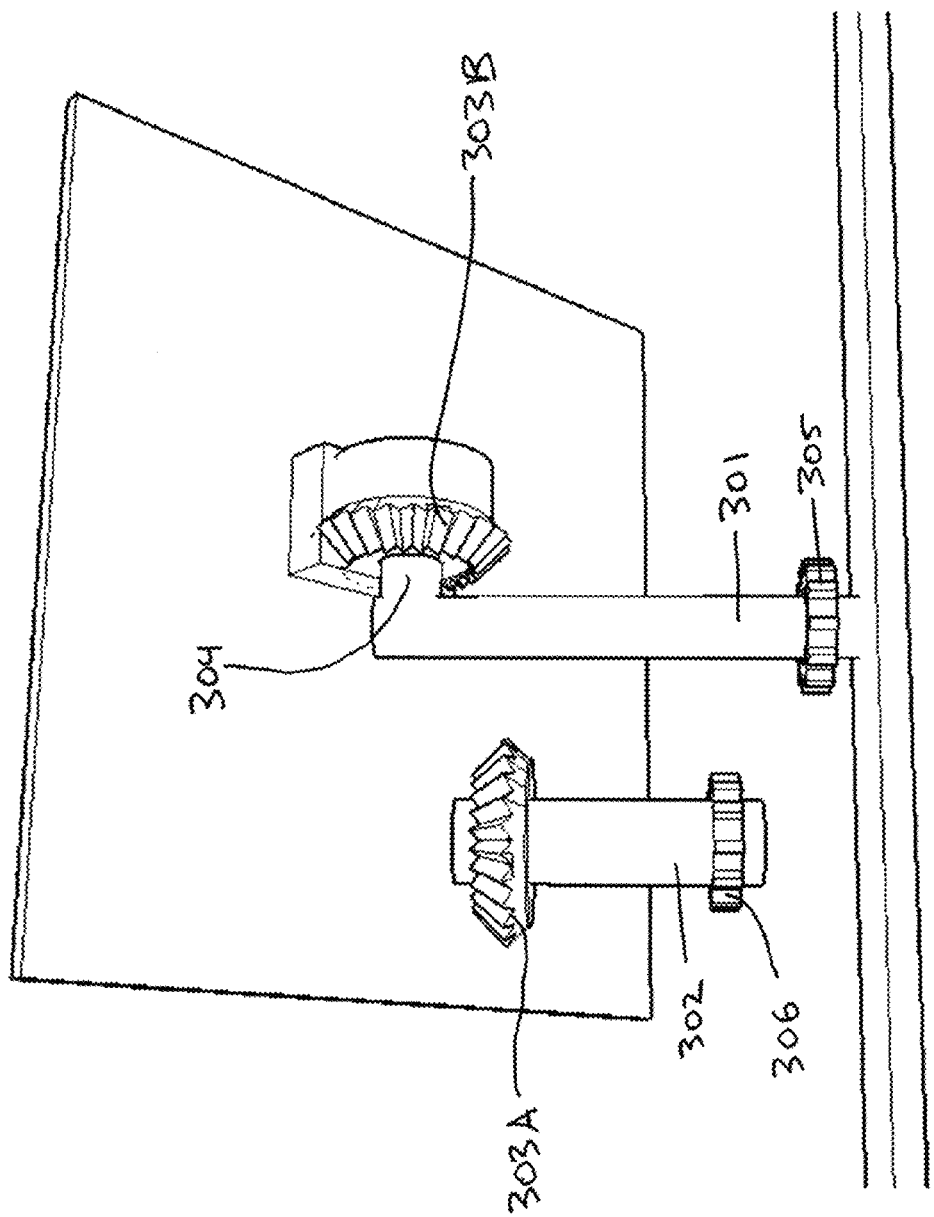
FIG. 4 is an illustration of an exploded view of the mechanical position locking mechanism in accordance with an embodiment.

FIG. 4 is an illustration of an exploded view of the mechanical position locking mechanism in accordance with an embodiment. FIG. 4 is an exploded view of FIG. 3. The outer tubular linking structure (302) and the two gears fixed to it are shown as a separate component. This view demonstrates that the input gear in the right angle gearbox (303A) is fixed to the outer linking structure (302) and thus rotates around the inner linkage (301). The output gear of the right angle gearbox (303B) is free to rotate about a shaft (304) fixed to the inner linking structure. Certain configurations of gears in the mechanical position locking mechanism's gear train would allow the system to be back driven by wind or uneven surface loading. This can be prevented by introducing high levels of friction into the system or by selecting a gear system—such as worm or harmonic gear set—that cannot be back driven.

Figure 5:
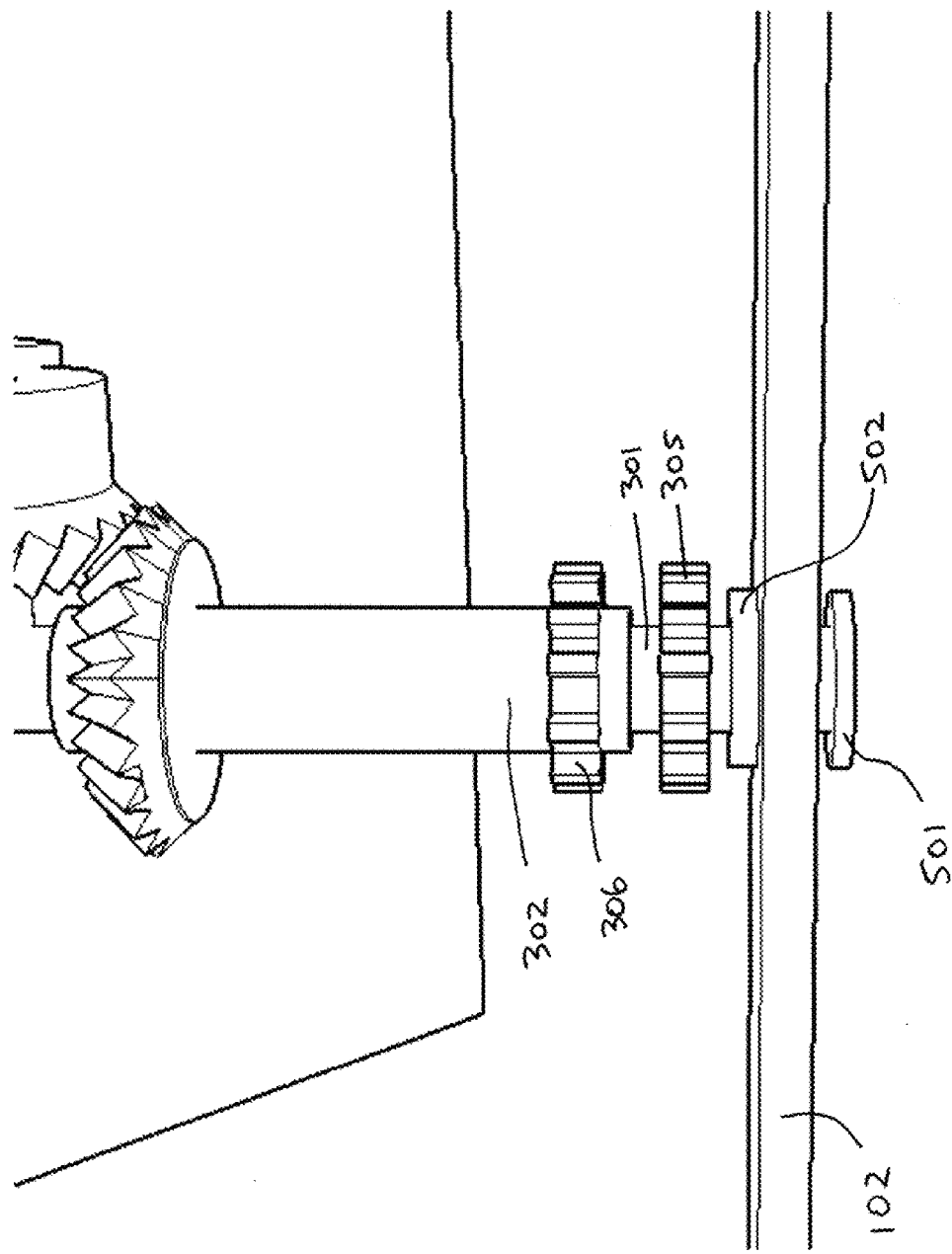
FIG. 5 is an illustration of the mechanical position locking system attached to a support beam in accordance with an embodiment.

FIG. 5 is an illustration of the mechanical position locking system attached to a support beam in accordance with an embodiment. FIG. 5 shows that the mechanical position locking mechanism is attached to the support beam (102). It also shows how one gear (305) may be attached to the inner linkage (301), and how another gear (306) may be attached to the outer linkage (302). In one embodiment, the inner linking structure may have a flange (501) at its base. This flange would prevent wind or other forces from pulling the mechanical position locking mechanism off of the support beam. The inner linking structure may also interface with a bearing (502) fixed to the support beam (102) in order to reduce friction.

Figure 6:
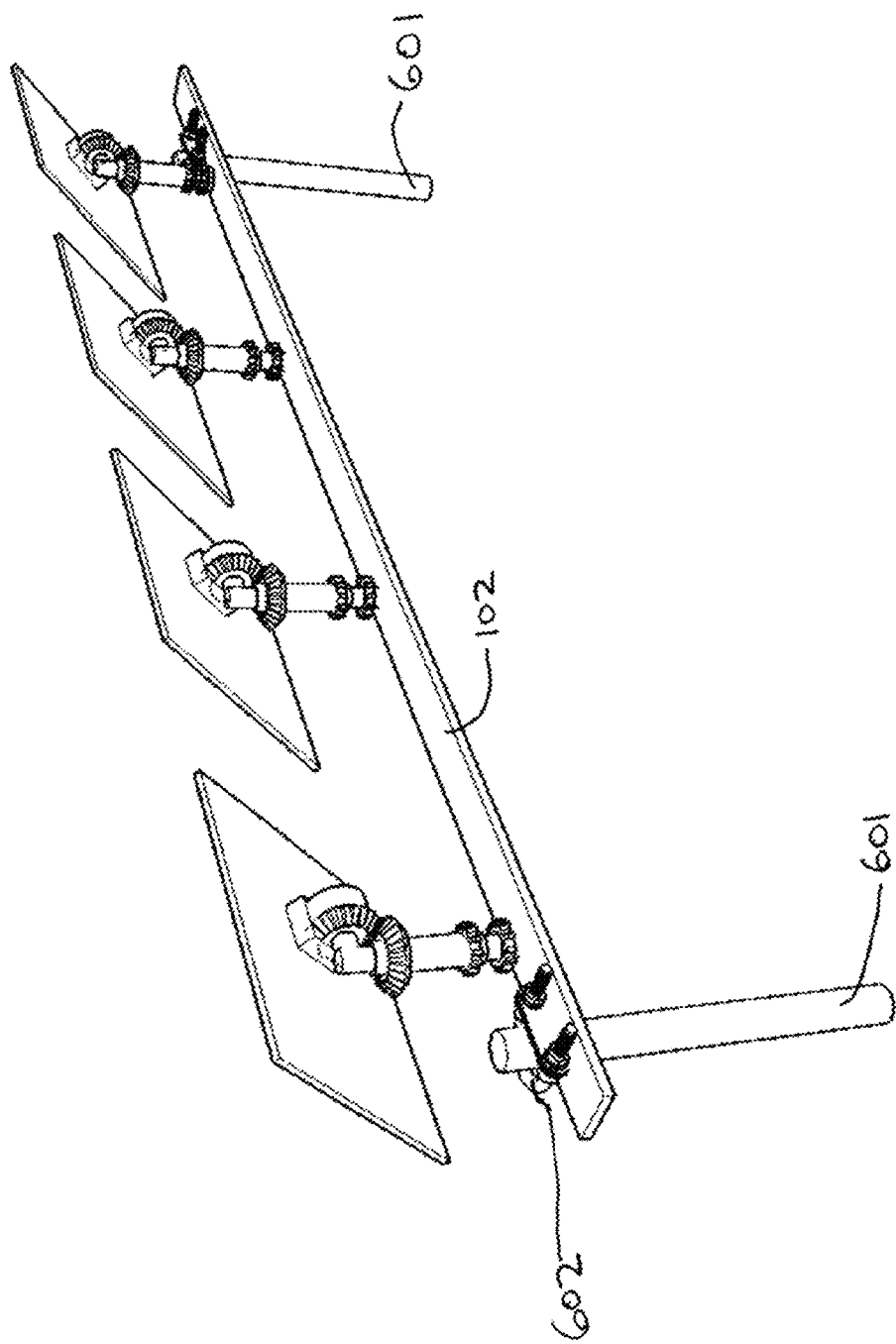
FIG. 6 is an illustration of a support beam ground mounted system in accordance with an embodiment.

FIG. 6 is an illustration of a support beam ground mounted system in accordance with an embodiment. FIG. 6 shows how the beam (102) may be securely installed in a ground-mounted system. In one embodiment, poles (601) may be driven into the ground and secured to the beam with mounting clips (602) that may or may not allow for adjustability. FIG. 6 depicts this mounting clip as a standard U-bolt. These poles could also be set in concrete or attached to weighted ballasts that prevent wind from overturning the system. In one embodiment, the ballast could be secured to the beam directly with mounting clips or a standard bolt pattern. Driven poles present the greatest degree of system flexibility as they can be installed to varying depths to account for local changes in the field height although in some embodiments the beam (102) does not need to be leveled. The system may be configured to have a multiplicity of support beams connected together to form one extended row for the robotic controller.

Figure 7:
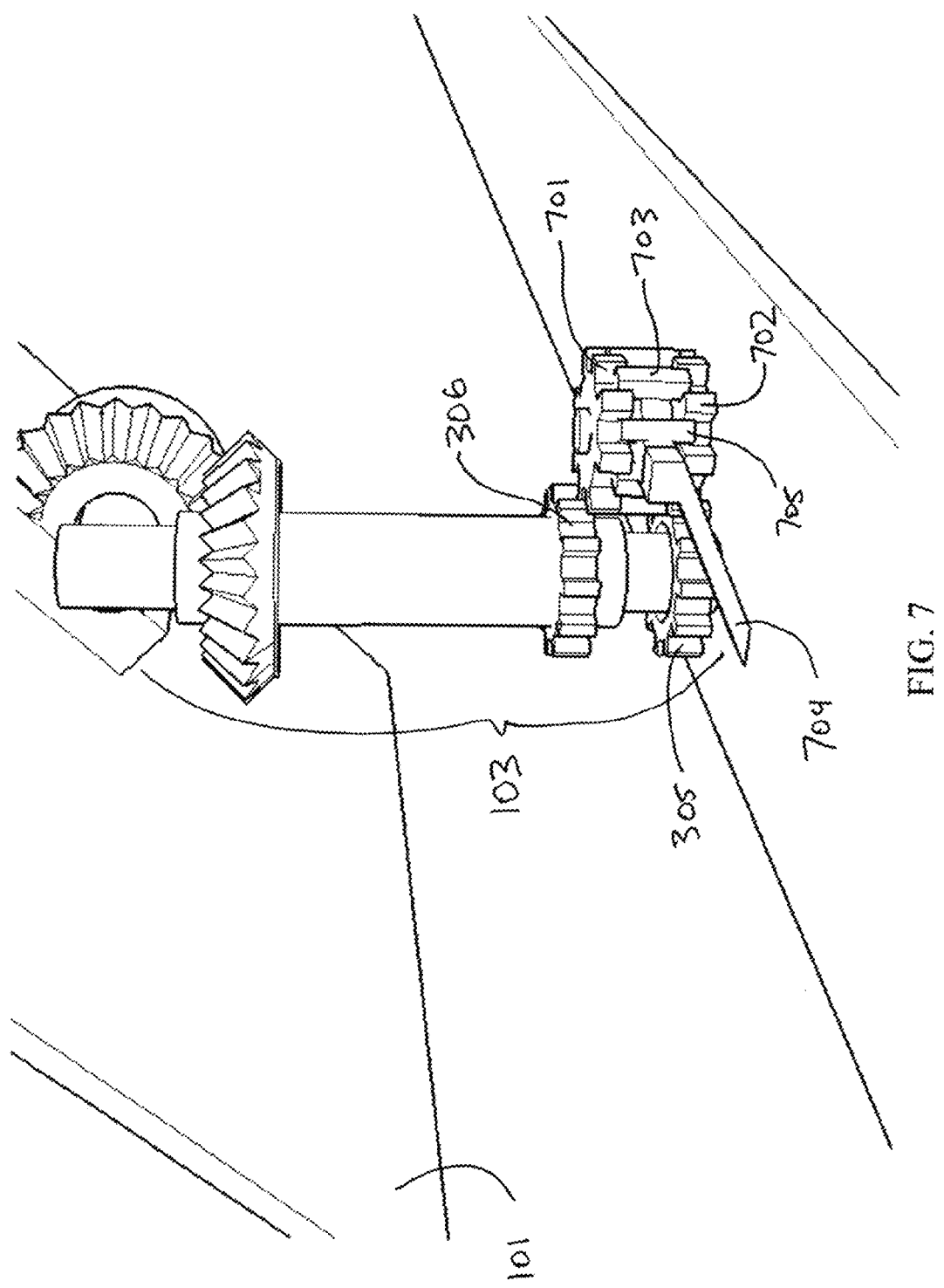
FIG. 7 is an illustration of a secondary gear train system that interfaces with a mechanical position locking mechanism in accordance with an embodiment.
Figure 8:
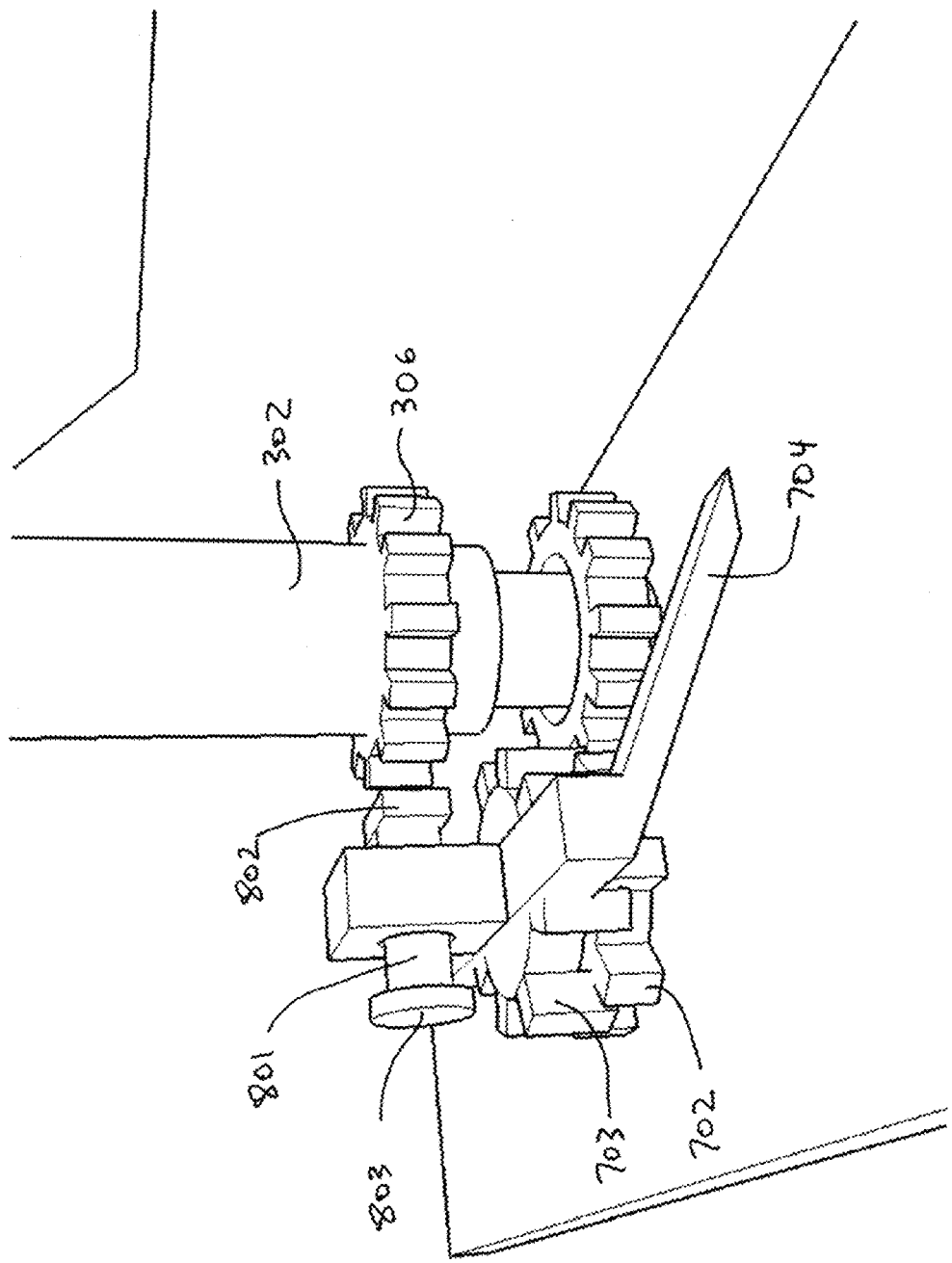
FIG. 8 is an illustration of another embodiment of a secondary gear train system that interfaces with a mechanical position locking mechanism.
Figure 9:
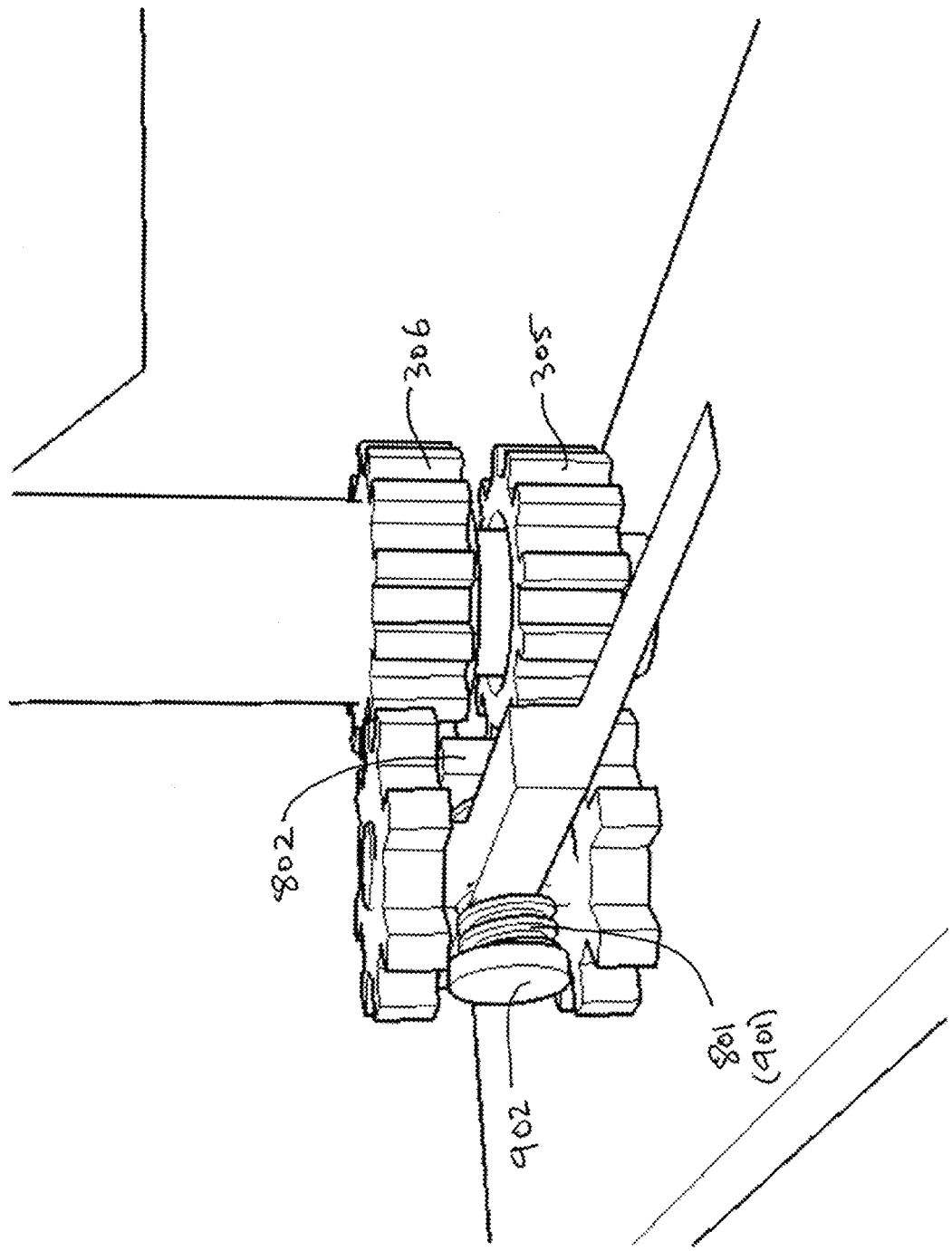
FIG. 9 is an illustration of another embodiment of a secondary gear train system that utilizes an actuated braking mechanism.

FIGS. 7-9 show other possible configurations for the mechanical position locking mechanism. This configuration introduces additional gears to the gear train and a braking mechanism that maintains the position of the system at times when the robotic controller is not adjusting the surface. A braking mechanism is particularly useful for gear train systems that do not have inherent anti-back drive properties.

FIG. 7 is an illustration of a secondary gear train system that interfaces with a mechanical position locking mechanism in accordance with an embodiment. FIG. 7 shows one embodiment of a secondary gear train system that interfaces with the input gears (305, 306) of the mechanical position locking mechanism (103) shown in FIGS. 1-6. A purpose of the additional gearing system is to allow for more precise control of an individual surface (101), and/or to provide direct gear train locking. In one embodiment the robotic controller interfaces with the final stage component or components in the gear train system to minimize the amount of torque needed to reposition a surface. In the depicted gear train configuration, a fixed linkage (704) supports the secondary gear train system. This gear train consists of a top final stage gear (701) that interfaces with the gear fixed to the outer linkage (306), and a bottom final stage gear (702) that interfaces with the gear fixed to the inner linkage (305). These final stage gears may also interface with a braking mechanism. This braking mechanism is designed to lock the position of the gears, e.g., to prevent any significant or substantial movement of the gears and therefore to prevent any significant movement of the surface based on gear slippage, for example, when a robotic controller is not adjusting an individual mechanical position locking mechanism. One such braking mechanism incorporates a gear that cannot be back driven—such as a worm drive—into any stage of the gear train. This type of gear can passively lock the position of an individual surface without the addition of an external brake.

Other braking mechanisms can function by active engagement and disengagement with any gear in the gear train system or directly with the inner and outer linkages. In the depicted model, two springs force the top and bottom final stage gears (701, 702) into a gear locking mechanism (703) in order to prevent the gear train from back driving. In other configurations, the top and bottom final stage gears may have a fixed vertical position and the gear locking mechanism could be spring-loaded. The gear locking mechanism may utilize friction pads and/or positive engagement (705) to prevent the final stage gears from rotating. In order to adjust the rotation of the final stage gears and reposition the surface, the robotic controller would first need to deactivate the braking mechanism.

It is not necessary for the robotic controller to rotate both final stage gears in order to control the surface in two axes. For example, if the top final stage gear (701) in this configuration is locked and the bottom final stage gear (702) is rotated, then the surface's azimuthal orientation and tilt will be adjusted simultaneously. A robotic controller that takes advantage of this effect would need to be able to disengage the top final stage gear from its brake and rotate the bottom final stage gear in order to change only the azimuthal orientation of the surface.

FIG. 8 is an illustration of another embodiment of a secondary gear train system that interfaces with a mechanical position locking mechanism. FIG. 8 demonstrates a simpler secondary gear train system that takes advantage of this effect. A fixed linkage (704) may support this secondary gear train system. In the depicted embodiment, the gear locking mechanism (703) works only in conjunction with the bottom final stage gear (702). The top final stage gear (701) shown in FIG. 7 is replaced with an actuated braking mechanism (801). One end of this actuated rod is outfitted with a braking pad (802) that may actively engage the outer linking structure (302) or the gear fixed to the outer linking structure (306). This braking pad may utilize friction and/or positive engagement to prevent the engaged system from rotating. The other end of this actuated rod (803) may contain metal or magnetic material to enable magnetic or electromagnetic adjustment. By actuating this system, the robotic controller can effectively lock and unlock the outer linking structure. This braking actuator may be spring-loaded in order to reduce the complexity of the robotic controller.

FIG. 9 is an illustration of another embodiment of a secondary gear train system that utilizes an actuated braking mechanism. The secondary gear train system that utilizes an actuated braking mechanism (801) simultaneously locks the position of the gears fixed to the inner and outer linking structures (305, 306). Similar to the actuated brake depicted in FIG. 8, this braking mechanism may be spring-loaded. The braking pad (802) could also be actuated by a screw drive system (901). In order to engage and disengage this braking mechanism, the robotic controller must be able rotationally control the actuator's input shaft (902). This input shaft may contain metal or magnetic material to enable magnetic or electromagnetic adjustment.

A robotic controller interfaces with a mechanical position locking mechanism (outlined in FIGS. 1-9) in order to adjust the orientation of a repositionable surface. There are many such interfaces that can be used to accomplish this goal. One class of solutions includes, but is not limited to, utilizing mechanical engagement to adjust the position of the input gears and/or braking mechanism. This can be accomplished using friction and/or positive engagement. Another class of solutions includes, but is not limited to, utilizing magnetic and/or electromagnetic engagement to adjust the position of the input gears and/or braking mechanism. This class of solutions has the potential to greatly increase the rated lifetime of the robotic controller, as it enables adjustment without physical contact. This style of engagement also allows the robotic controller and the mechanical position locking mechanism to be sealed from each other and the installation environment. Precise station alignment is also less important with electromagnetic systems as magnetic couplings can inherently account for misalignment.

Figure 10:
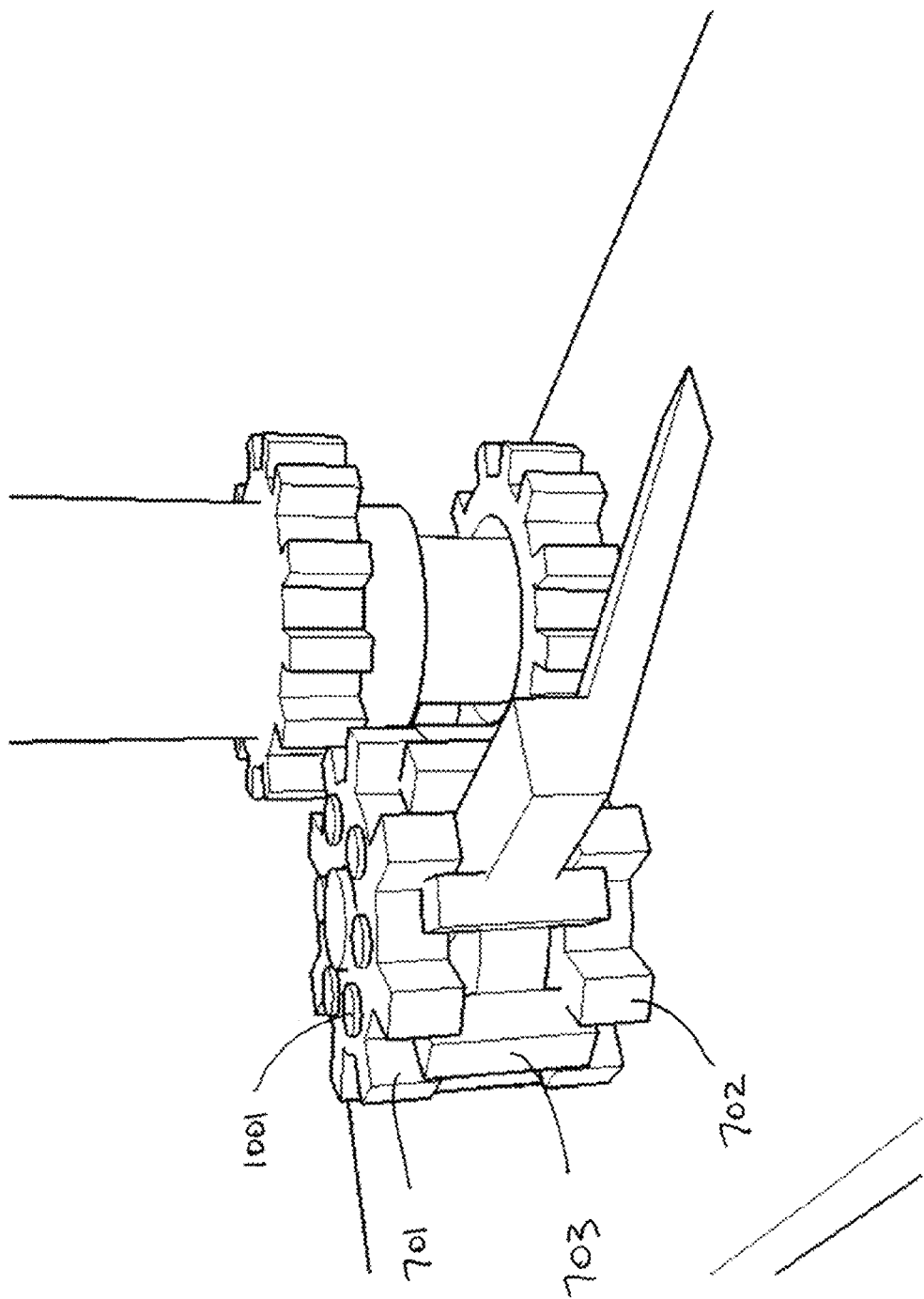
FIG. 10 is an illustration of an electromagnetic interface in accordance with an embodiment.

FIG. 10 is an illustration of an electromagnetic interface in accordance with an embodiment. FIG. 10 outlines one embodiment of a magnetic or electromagnetic interface. For ease of discussion the use of the term "electromagnetic" herein includes both electromagnetic and magnetic interfaces and effects. In this model, the top final stage gear (701) and the bottom final stage gear (702) are outfitted with a multiplicity of metal disks or magnets (1001). These disks interact with a magnetic or electromagnetic system on the robotic controller (not shown). The robotic controller's magnetic or electromagnetic system may provide a normal force on the top and bottom final stage gears. This effect is desirable as it can be utilized to disengage a final stage gear from its braking mechanism prior to, and throughout the adjustment process. This may be accomplished by spring-loading the final stage gears into a gear locking mechanism (702) that, as a default state, prevents them from rotating. When the magnetic or electromagnetic system of the robotic controller is activated, it provides a normal force that disengages the top and bottom final stage gears from the gear locking mechanism. This in turn allows the robotic controller to directly control the position of each final stage gear.

From a functionality standpoint, the final gear in the gear train system may behave as if it were one half of an axial flux motor. The robotic controller may contain the other half of the conceptual axial flux motor and would distribute this complexity—along with the complexity of individual calibration, wiring, and surface control—amongst many position-locking mechanisms. The scope of the present invention, however, is not meant to be limited to input repositioning via rotational motion. While these systems are conceptually easier to understand, the present invention could utilize a variety of input motions, including linear or non-linear mechanisms, to actuate the repositionable surface with two degrees of freedom.

Figure 11:
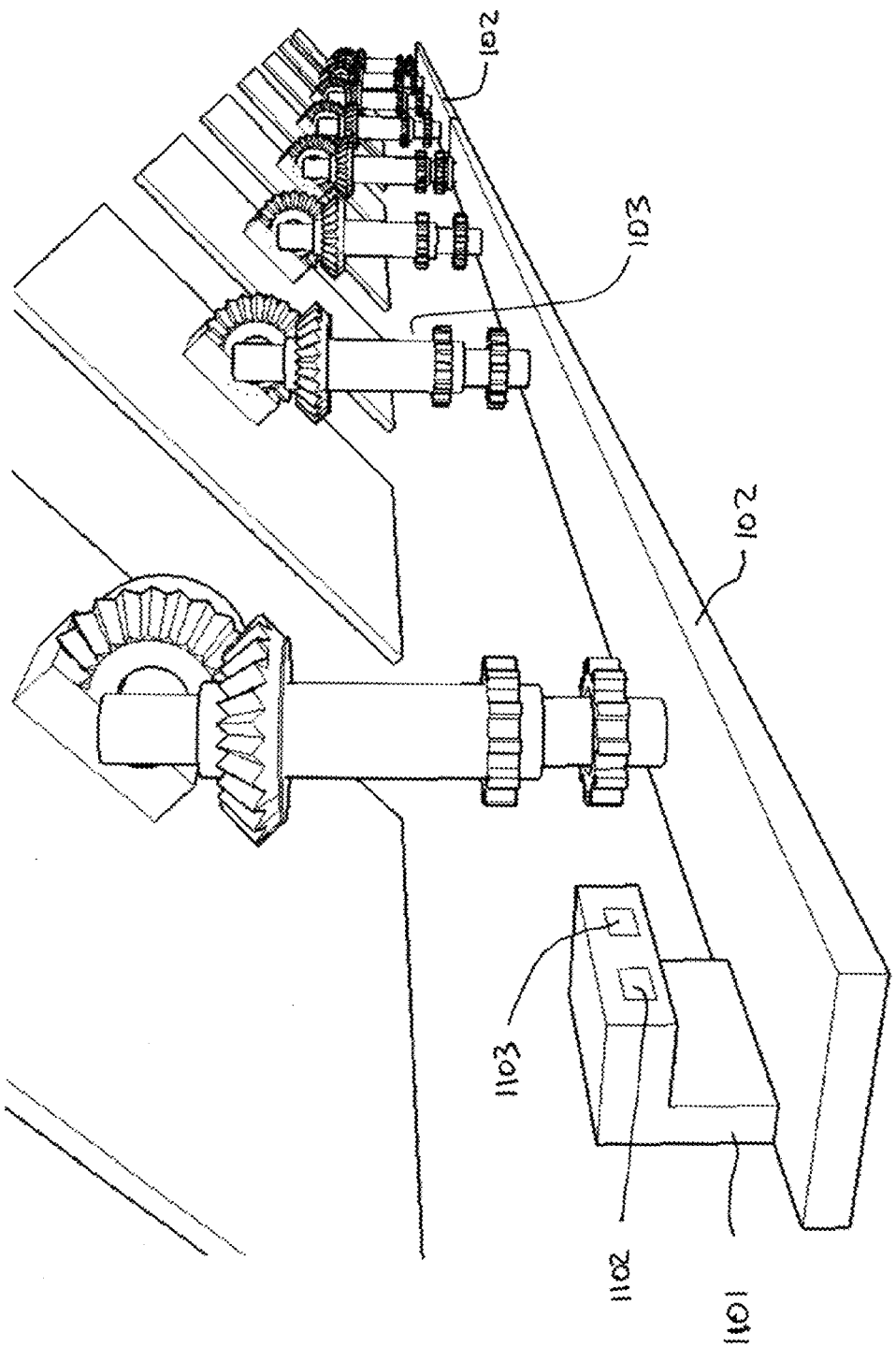
FIG. 11 is an illustration of a system that provides power to the robotic controller via a contact based charging system in accordance with an embodiment.
Figure 12:
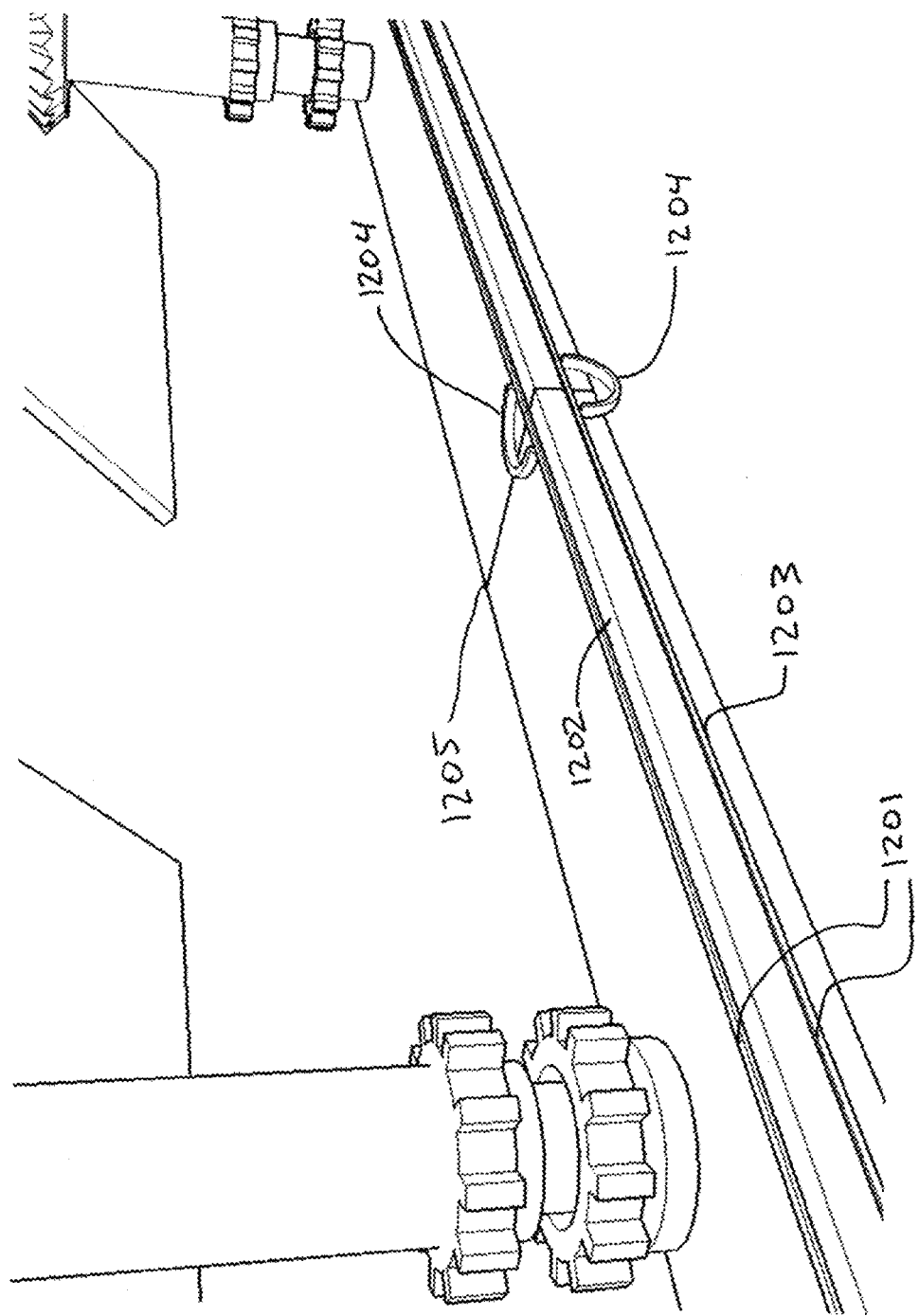
FIG. 12 is an illustration of a system that provides power to the robotic controller via an electrified rail in accordance with an embodiment.

FIGS. 11 and 12 demonstrate various methods of providing power to the robotic controller. The robotic controller may require energy in order to power electronic components and/or an onboard drive system that is capable of transporting the controller between adjustment stations. The robotic controller may also require power to adjust individual position locking mechanisms.

FIG. 11 shows a system that provides power to the robotic controller via a contact based charging system in accordance with an embodiment. The purpose of this system is to charge an energy storage system onboard the robotic controller. The charging system may be composed of a support arm (1101) that holds a positive (1102) and negative (1103) contact patch. The robotic controller may engage these contact patches with metallic brushes and/or wheels. The charging system could be placed at any point along the beam. In the preferred embodiment, it is placed at the end of a long row composed of a multiplicity of support beams (102) and position locking mechanisms (103). The robotic controller may use the charging system to recharge its energy storage system at any time. If it carries an onboard energy storage system with a small capacity, it may recharge during or at the end of each row adjustment cycle. In an embodiment, it will carry enough energy storage capacity for an entire day of adjustment and recharge at nighttime. The charger may utilize direct contact or electromagnetic induction to transfer power to the robotic controller. The source of the charging energy may be a battery that itself is charged using solar energy.

FIG. 12 is an illustration of a system that provides power to the robotic controller via an electrified rail in accordance with an embodiment. FIG. 12 shows a system that can provide continuous power to the robotic controller via an electrified rail (1201). This system could be used to recharge the robotic controller's onboard energy storage system or to power the robotic controller directly. The electrified rail may consist of a positive (1202) and negative (1203) contact strip that the robotic controller could engage with brushes and/or wheels. The junctions (1205) between support beams would require an electrical path connector (1204) in order to create a continuous row of electrified track for the robotic controller. The functional duty of providing continuous power could also be achieved by connecting a wire from a power source to the robotic controller. In a tethered system, the robotic controller would require a mechanism—such as a cable carrier—to manage excess wire.

Figure 13:
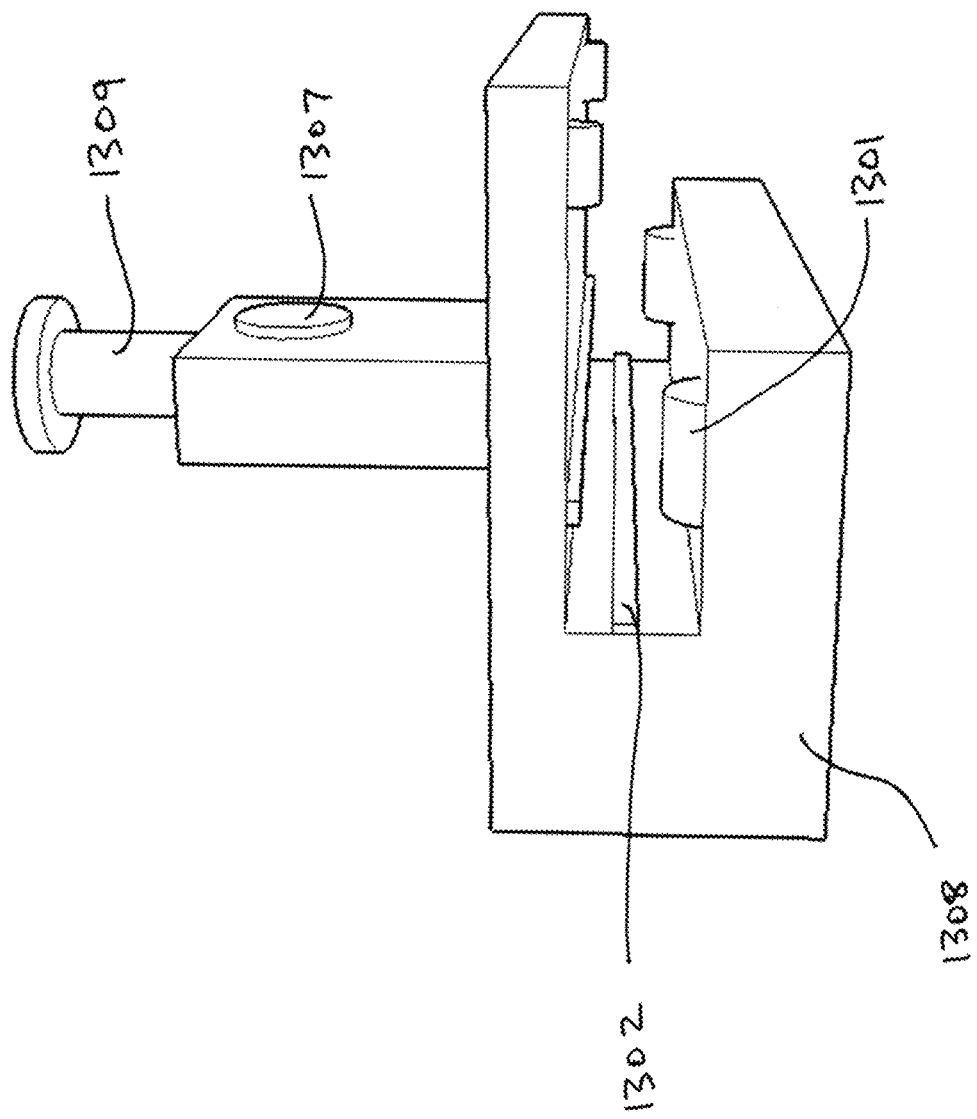
FIG. 13 is an illustration of a robotic controller in accordance with an embodiment.
Figure 14:
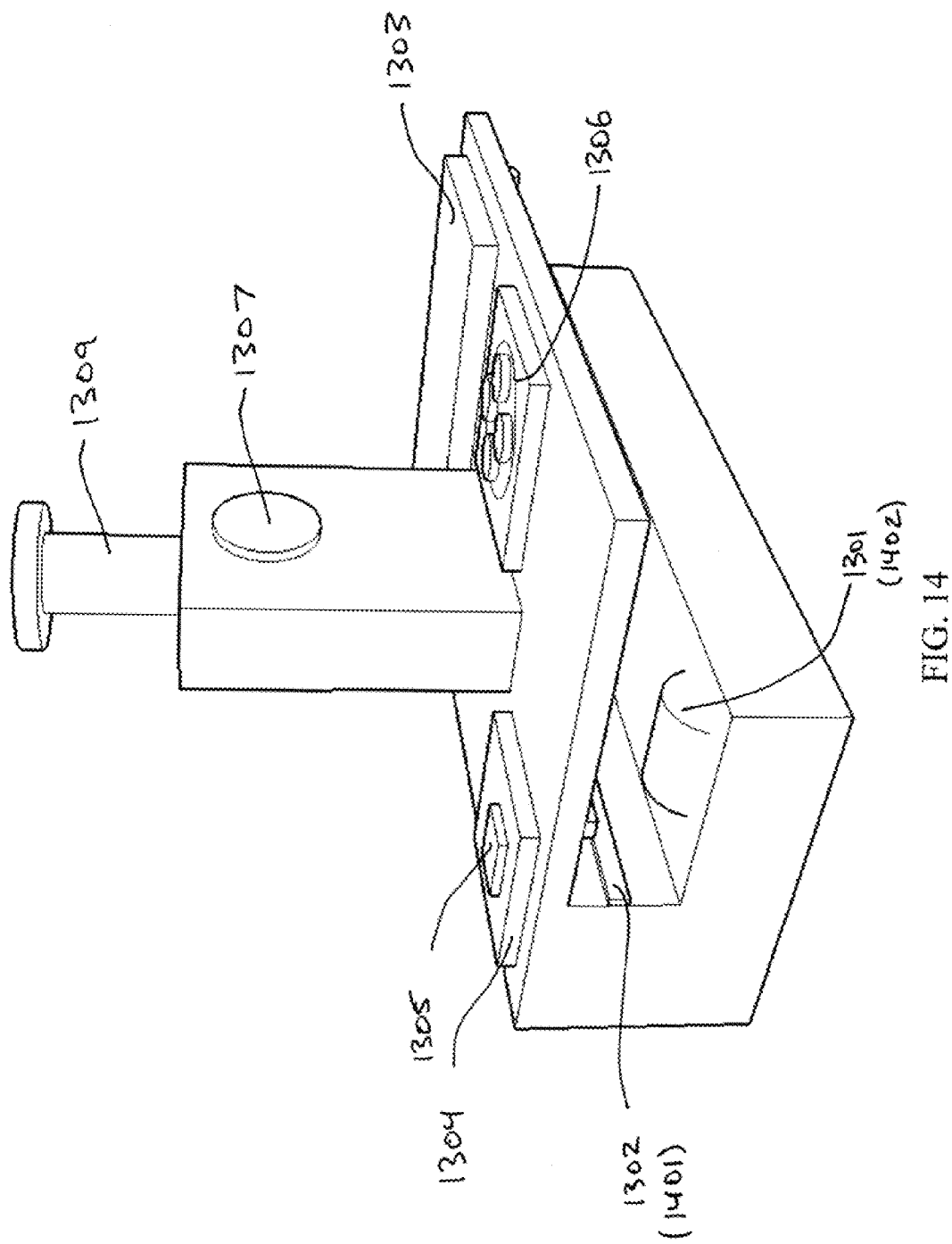
FIG. 14 is a more detailed illustration of a robotic controller with its top chassis removed in accordance with an embodiment.
Figure 15:
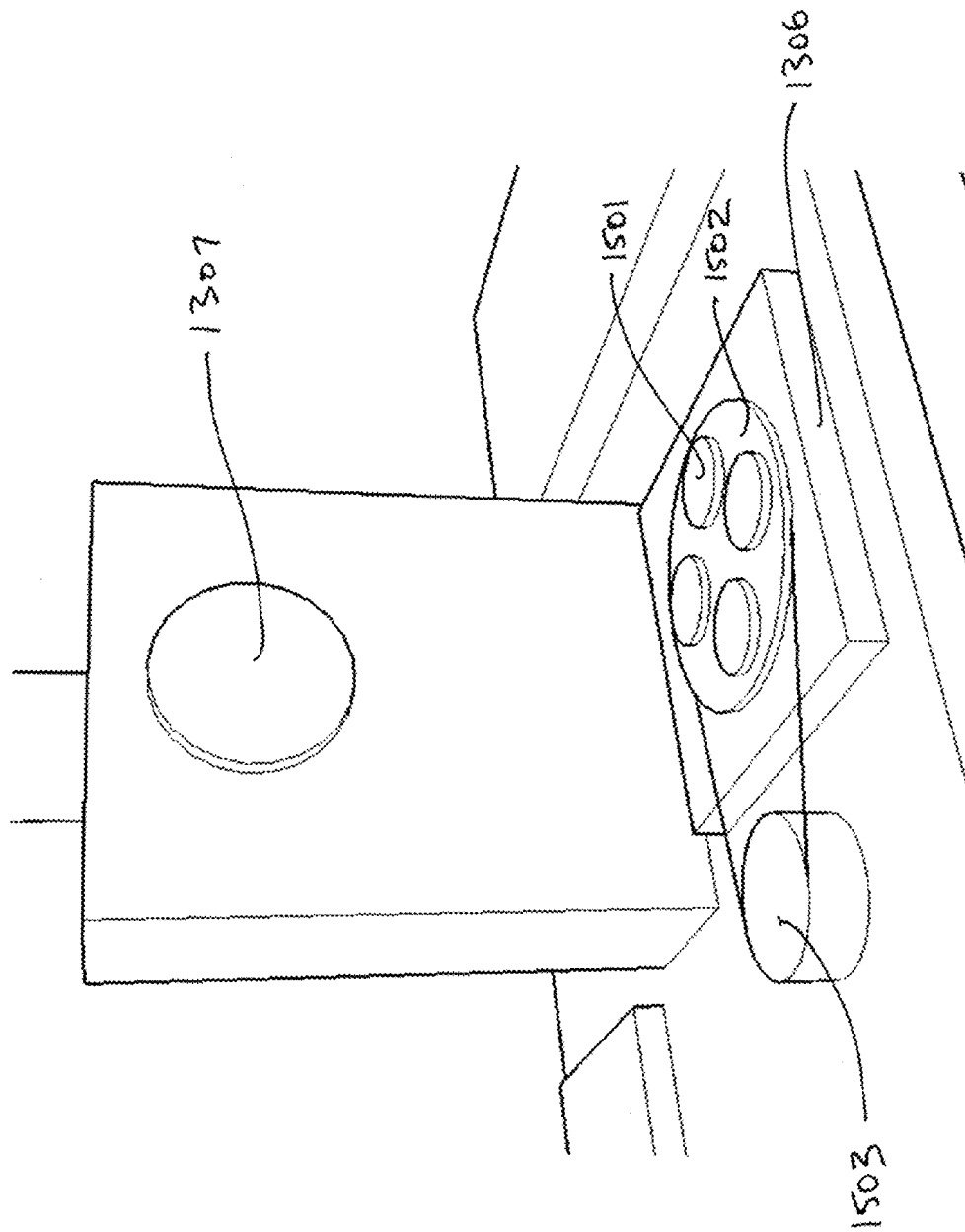
FIG. 15 is a more detailed illustration of an electromagnetic interface system of a robotic controller in accordance with an embodiment.

FIGS. 13-15 demonstrate one embodiment of the robotic controller that calibrates and/or adjusts each mechanical position locking mechanism individually. The purpose of the robotic controller is to aggregate as many of the complex control elements needed to properly position an independent surface into one, field replaceable component. At its most basic functional level, the robotic controller must be able to move between mechanical position locking mechanisms, align itself properly to an adjustment station, disengage a braking mechanism (if necessary), manipulate the mechanical position locking mechanism, and reengage the braking mechanism (if necessary). Additional calibration sensors may be attached to the robotic controller to enable the robot to determine how the repositionable surface should be oriented for various solar applications. FIGS. 13-15 demonstrate how a robotic controller may adjust and calibrate a mechanical position locking mechanism that utilizes a gear train system (see FIG. 8) to transmit rotational input motion into two degrees of surface freedom.

FIG. 13 is an illustration of a robotic controller in accordance with an embodiment. FIG. 13 depicts an overview of the systems that may be incorporated into the robotic controller (104) in order to achieve the aforementioned basic functional goals. These systems may include, but are not limited to; a drive system (1301) to transport the collection of systems between mechanical position locking mechanisms, an electrical power interface (1302) that is able to receive electrical energy from an electrified rail (1201), tethered cable, or static charging system, an energy storage system (1303)(see FIG. 14) that is capable of receiving energy from the electrical power interface and providing power to onboard systems, a central or distributed processing system (1304) (see FIG. 14) that is able to give and/or receive commands from various components, a data logging system (1305) (see FIG. 14) that is capable of storing information from onboard sensors, a magnetic, electromagnetic, or mechanical adjustment interface (1306) (see FIG. 14) that is able to manipulate the mechanical position locking mechanism, a magnetic, electromagnetic, or mechanical adjustment interface (1307) that is able to engage and/or disengage a braking system, an internal wiring system to connect system components, a chassis (1308) to house system components, and a calibration system (1309) that is able to characterize a surface with two degrees of freedom. This calibration system is composed of more components that may include, but are not limited to; a camera, an individual processing unit, a structured light emission and detection system, a laser distance sensor, and a position location system that is able to determine the global or relative positioning of the robotic controller.

In an alternate embodiment, multiple robotic controllers may be included in a single track. This can increase the frequency of adjustments of the solar surfaces and also provide a fail-safe system in the event one or more robotic controllers stop operating. The robotic controllers can include computers (or other processing devices, for example) that permit wireless or wireline communication to other robotic controllers and/or to a central station (not shown). The central station (or multiple central stations) can include processors, memory, storage, wireless communication devices to provide a centralized system that can transmit and receive information to the robotic controllers and to a provide software/firmware updates and database updates. The centralized station(s) can be local to the robotic controllers, e.g., within several hundred meters. In addition, the centralized stations may communicate with a remote headquarters server that can maintain status and provide instructions to many remote solar energy collection systems.

FIG. 14 is a more detailed illustration of a robotic controller with its top chassis removed in accordance with an embodiment. FIG. 14 shows the robotic controller with its top chassis removed. The depicted permutation uses two electromagnetic interfaces to adjust the mechanical position locking mechanism. One electromagnetic interface (1307) is used to adjust the position of an actuated braking mechanism (801). If the actuated braking mechanism is spring-loaded and contains metal or magnetic material, the robotic controller will be able to engage and disengage the brake by activating and deactivating a simple electromagnet. If the actuated braking system utilizes a screw drive mechanism (901) for actuation, the robotic controller's electromagnetic interface provides rotational motion to the actuator's input shaft (902). This may be accomplished by turning the interface into a conceptual axial flux motor wherein one end of the screw actuated braking mechanism contains metal or magnetic material and the robotic controller's interface (1307) contains electromagnets and control electronics.

Another electromagnetic interface (1306) is used to adjust the rotation of the mechanical position locking mechanism's final stage gear. This interface may be composed of static or mobile electromagnets that interact with the metal or magnetic disks (1001) attached to the bottom final stage gear (702) of the mechanical position locking mechanism. This interface may behave as if it were an axial flux or induction motor wherein the complex components are contained in the robotic controller, and a minimum number of passive components are incorporated into the mechanical position locking mechanism.

A power source connected to the electrified rail (not shown) may transfer energy to the robotic controller. The robotic controller receives this electrical energy through an electrical power interface (1302) that may include contact brushes (1401) or wheels. The robotic controller may store this electrical energy using its onboard energy storage system (1303).

A drive system (1301) onboard the robotic controller is able to transport the collection of systems between position locking mechanisms. This may be accomplished with a drive motor and drive wheels (1402). This goal may also be achieved through the use of an external drive mechanism such as a belt, chain, or cable drive system.

FIG. 15 is a more detailed illustration of an electromagnetic interface system of a robotic controller in accordance with an embodiment. FIG. 15 shows a close up view of the electromagnetic interface systems. One system (1307) is used to actuate the braking mechanism and another mobile electromagnetic system (1306) is used to adjust the rotation of the position locking mechanism's bottom final stage gear. The interface that controls the actuated braking mechanism may include of a single electromagnet that interacts with a spring-loaded braking mechanism via magnetic engagement.

In this permutation, the mobile electromagnetic system consists of four electromagnets (1501) on a rotating platform (1502). The platform is connected to a drive mechanism (1503) that can provide sufficient torque to rotate the system. The four electromagnets are activated simultaneously and interact with the four metal or magnetic disks (1001) on the bottom final stage gear (702) of the mechanical position locking mechanism. When the drive system rotates the mobile electromagnet system (1306), this in turn rotates the bottom final stage gear that is now electromechanically coupled to the four electromagnets (1501). This enables the robotic controller's mobile electromagnetic system to adjust the positioning of the bottom final stage gear in the mechanical position locking mechanism.

Figure 16:
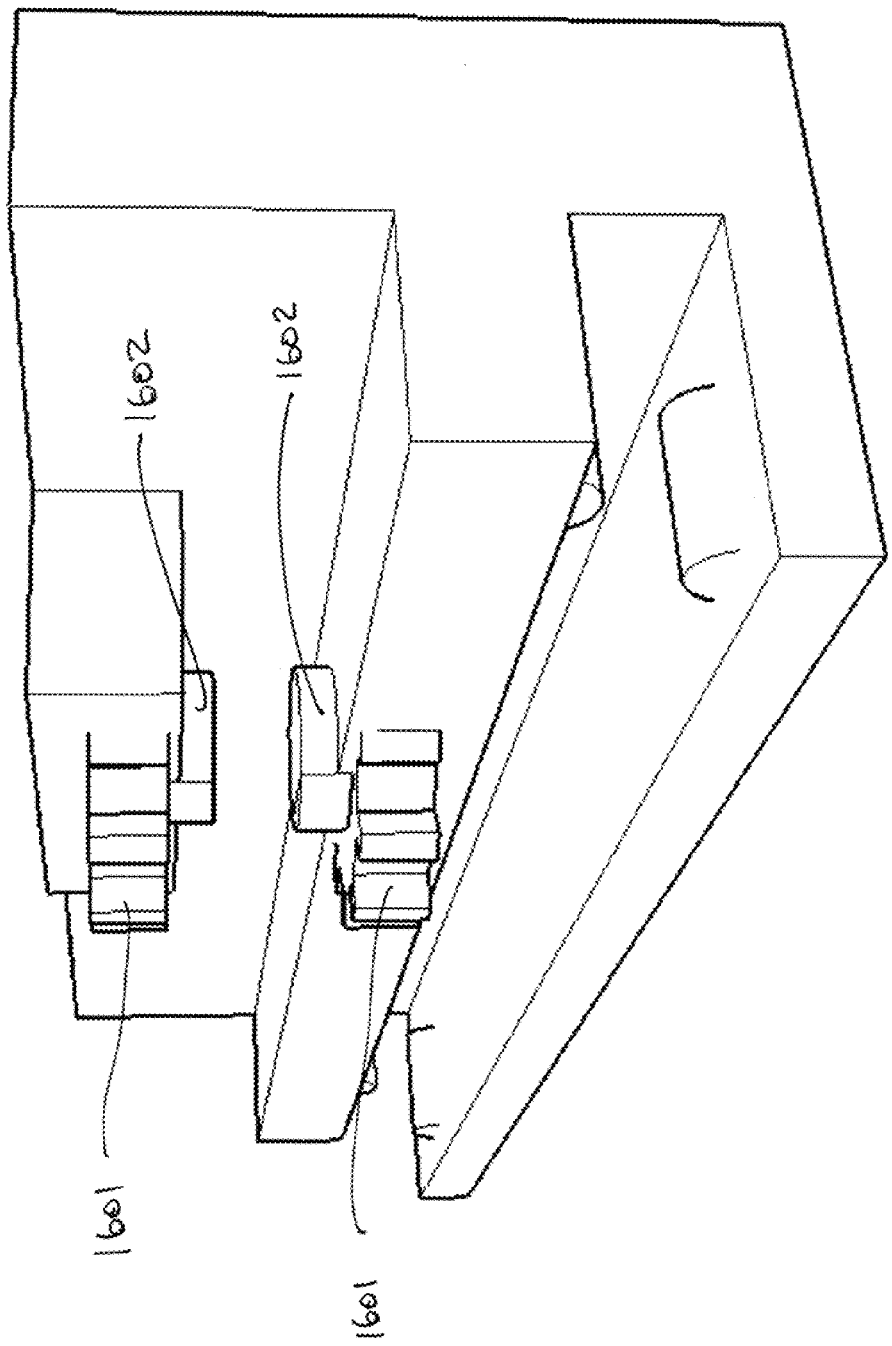
FIG. 16 is an illustration of a robotic controller that calibrates and/or adjusts each position locking mechanism using a mechanical interface in accordance with an embodiment.

FIG. 16 is an illustration of a robotic controller that calibrates and/or adjusts each position locking mechanism using a mechanical interface in accordance with an embodiment. This mechanical adjustment interface physically engages the final stage gears of the mechanical position locking mechanism. This may be accomplished with positive engagement and/or friction. The depicted system utilizes two adjustment gears (1601) that mate with the final stage gears of the mechanical position locking mechanism. Onboard motors (1602) are attached to these adjustment gears (1601) and are able to rotate them precisely and individually. The onboard motors are thus able to control the position of the solar surface when the adjustment gears (1601) are mated with the final stage gears of the mechanical position locking mechanism.

Figure 17:
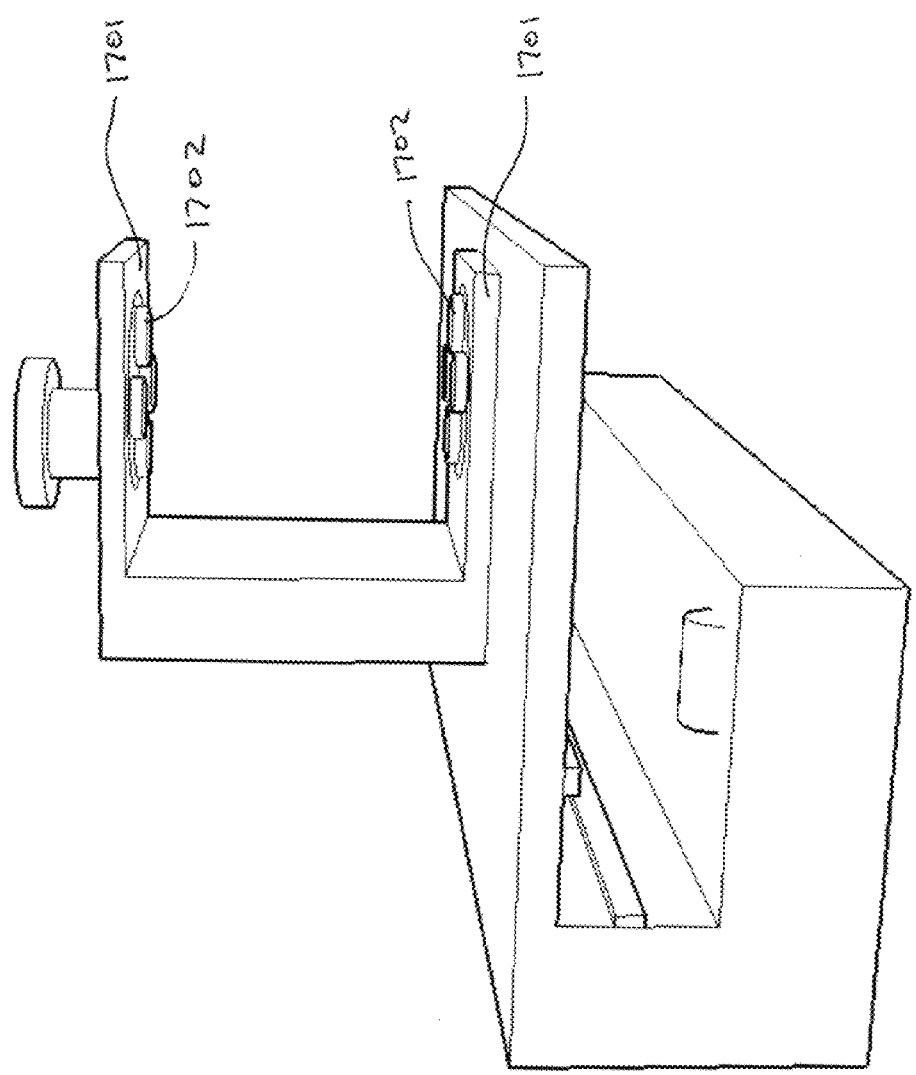
FIG. 17 is an illustration of a robotic controller that calibrates and/or adjusts each position locking mechanism using two electromagnetic interfaces in accordance with an embodiment.

FIG. 17 is an illustration of a robotic controller that calibrates and/or adjusts each position locking mechanism using two electromagnetic interfaces in accordance with an embodiment. FIG. 17 demonstrates one embodiment of the robotic controller that calibrates and/or adjusts each mechanical position locking mechanism using two static electromagnetic interfaces (1701). Each interface consists of a multiplicity of electromagnetic coils (1702) that can be activated individually. These coils interface with the metal or magnetic disks (1001) embedded into the final stage gears (701, 702) of the mechanical position locking mechanism. When activated properly, this system may function as if it were an axial flux or induction motor. These electromagnetic coils may be powered by the robotic controller's onboard energy storage system and/or electrical power interface.

Figure 18:
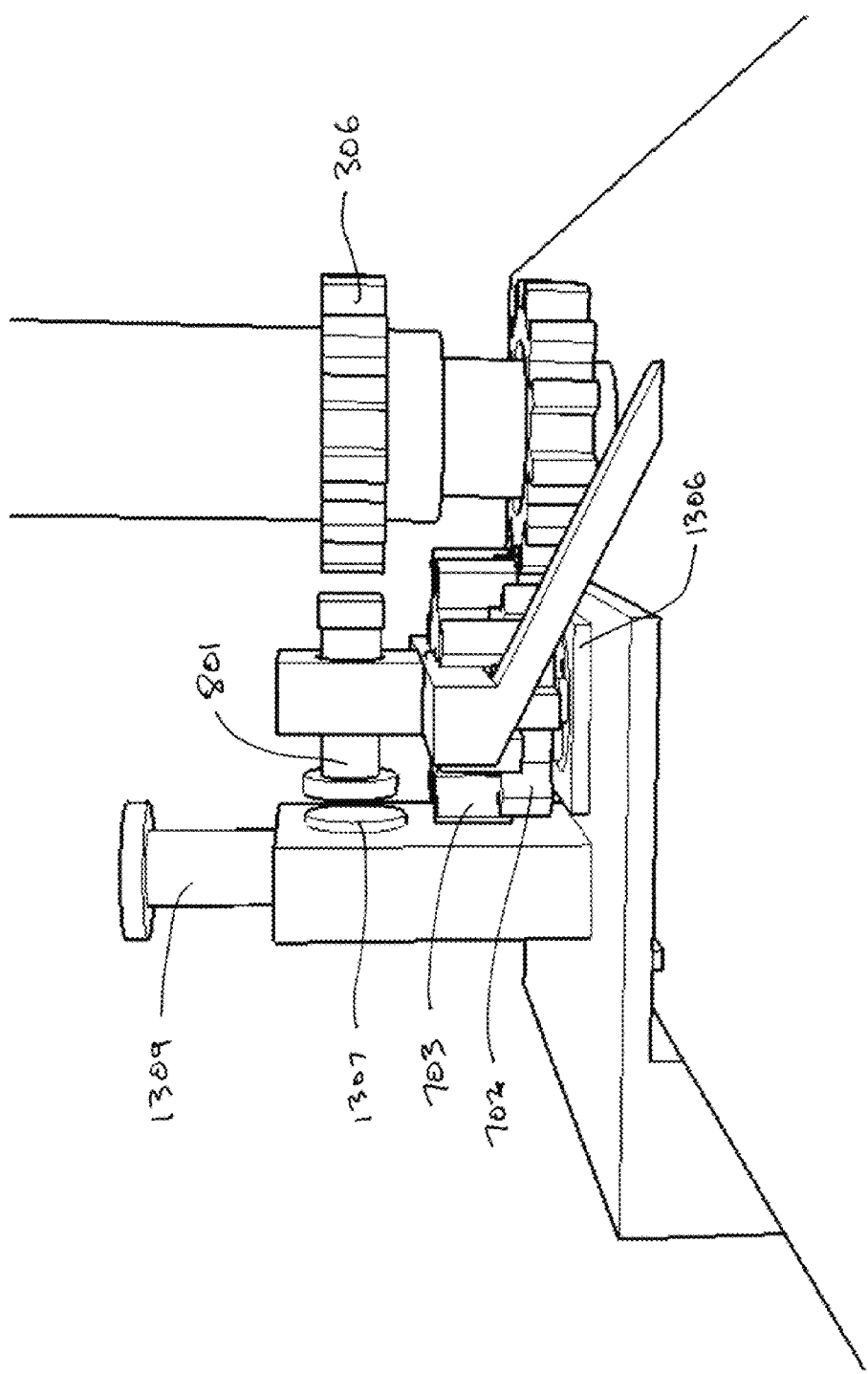
FIG. 18 is an illustration of a robotic controller in accordance with an embodiment.

FIG. 18 is an illustration of a robotic controller in accordance with an embodiment. FIG. 18 combines the systems described in FIGS. 13-15 and FIG. 8 to better demonstrate how a robotic controller may be used to calibrate and/or adjust a multiplicity of mechanical position locking mechanisms. The process may begin with the activation of the robotic controller's central processing unit. This computational system determines at a high level how the robotic controller should interact with the system of mechanical position locking mechanisms. It is also able to send low-level commands to onboard components to carry out aforementioned high-level functions. In an embodiment a step in the computational process is to pull information from past operational history and/or onboard calibration sensors (1309). This assists the robotic controller in determining its current position on the support beam. The next step is to determine how the robot should transport itself to the next adjustment station.

Once calculated, the robotic controller may activate its drive system—which may include of a single drive motor attached to a drive wheel, for example—until it arrives at an adjustment station. In order to identify a station, the robotic controller may use any of a variety of methods to identify the proper position. Examples include a camera system able to detect the mechanical position locking mechanism's features. Its drive system may also utilize prior knowledge of the system to move the robotic controller a pre-calculated distance. The robotic controller may also use a metal or magnetic material detection system that is able to sense a piece of metal or magnet placed at each mechanical position locking mechanism. Once at a position locking mechanism, the central processor may again send commands to the drive system in order to achieve precise station alignment.

Before the adjustment process begins, the robotic controller may pull additional information from its past operational history and/or calibration sensors to better determine the current orientation of the repositionable surface and/or to calculate the necessary amount of adjustment. Once this is complete, the robotic controller may activate its electromagnetic interface (1307) that controls the position of the actuated braking mechanism (801). This effectively unlocks the position of the gear (306) fixed to the outer linking structure.

The electromagnets (1501) in the mobile electromagnetic system (1306) can now be activated. This activation provides a normal force on the bottom final stage gear (702) of the mechanical position locking mechanism that releases it from the gear locking mechanism (703). Once disengaged, the system is unlocked and can be repositioned by activating the drive mechanism (1503) that controls the rotational position of the mobile electromagnetic system. Adjusting the rotation of the bottom final stage gear with the brake disengaged adjusts only the azimuthal orientation of the surface. In order to change the tilt of the surface, the robotic controller can reengage the braking mechanism by deactivating its electromagnetic braking interface (1307). Adjusting the lower final stage gear with the brake engaged will adjust both tilt and azimuthal orientation.

After the repositioning process is complete, the central processing unit may log adjustment data for future repositioning sessions. It may also pull data from its calibration sensors to verify that the surface has been correctly repositioned. This verification process may use any of a variety of methods. Examples include utilizing an onboard light emission mechanism that projects structured light onto the underside of the solar surface and a collocated camera that is able to detect patterns of structure light on the solar surface. The robotic controller's onboard processing unit may then process this information to fit a multiplicity of detected points to a geometric plane. In order to verify that the surface is correctly positioned, the robotic controller's software checks that the desired orientation of the surface matches the measured orientation.

Figure 19:
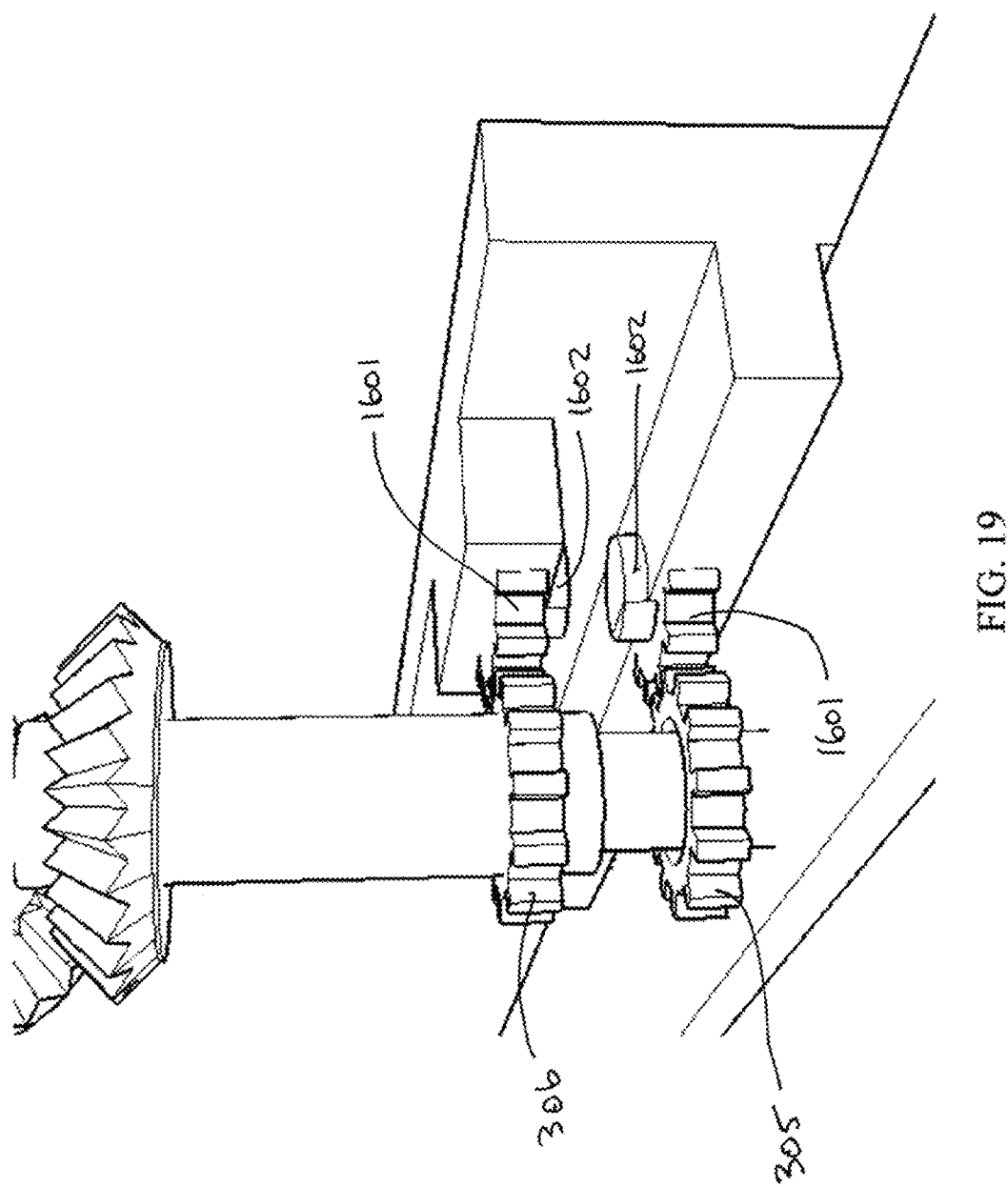
FIG. 19 is an illustration of a robotic controller utilizing a mechanical adjustment interface in accordance with an embodiment.

FIG. 19 is an illustration of a robotic controller utilizing a mechanical adjustment interface in accordance with an embodiment. FIG. 19 combines the systems described in FIG. 16 and FIG. 3 to better demonstrate how a robotic controller may be used to calibrate and/or adjust a multiplicity of position locking mechanisms utilizing a mechanical adjustment interface. The robotic controller's process is very similar to the process outlined in FIG. 18. However, instead of activating an electromagnetic interface to adjust the position of the position locking mechanism, this configuration uses direct mechanical engagement.

After the robotic controller has properly aligned itself to an adjustment station and calculated the adjustment needed to reposition a surface, it may physically engage its adjustment gears (1601) with the input gears (305, 306) of the mechanical position locking mechanism. The engagement process may be as simple as accurately pulling into an adjustment station and allowing the gear sets to mate. This easy engagement process demonstrates one of the main advantages of selecting a gear train system with input shafts that remain in the same position throughout all points of travel. Once engaged, the robotic controller may activate its onboard motors (1602) to rotate the input gears of the mechanical position locking mechanism.

Figure 20:
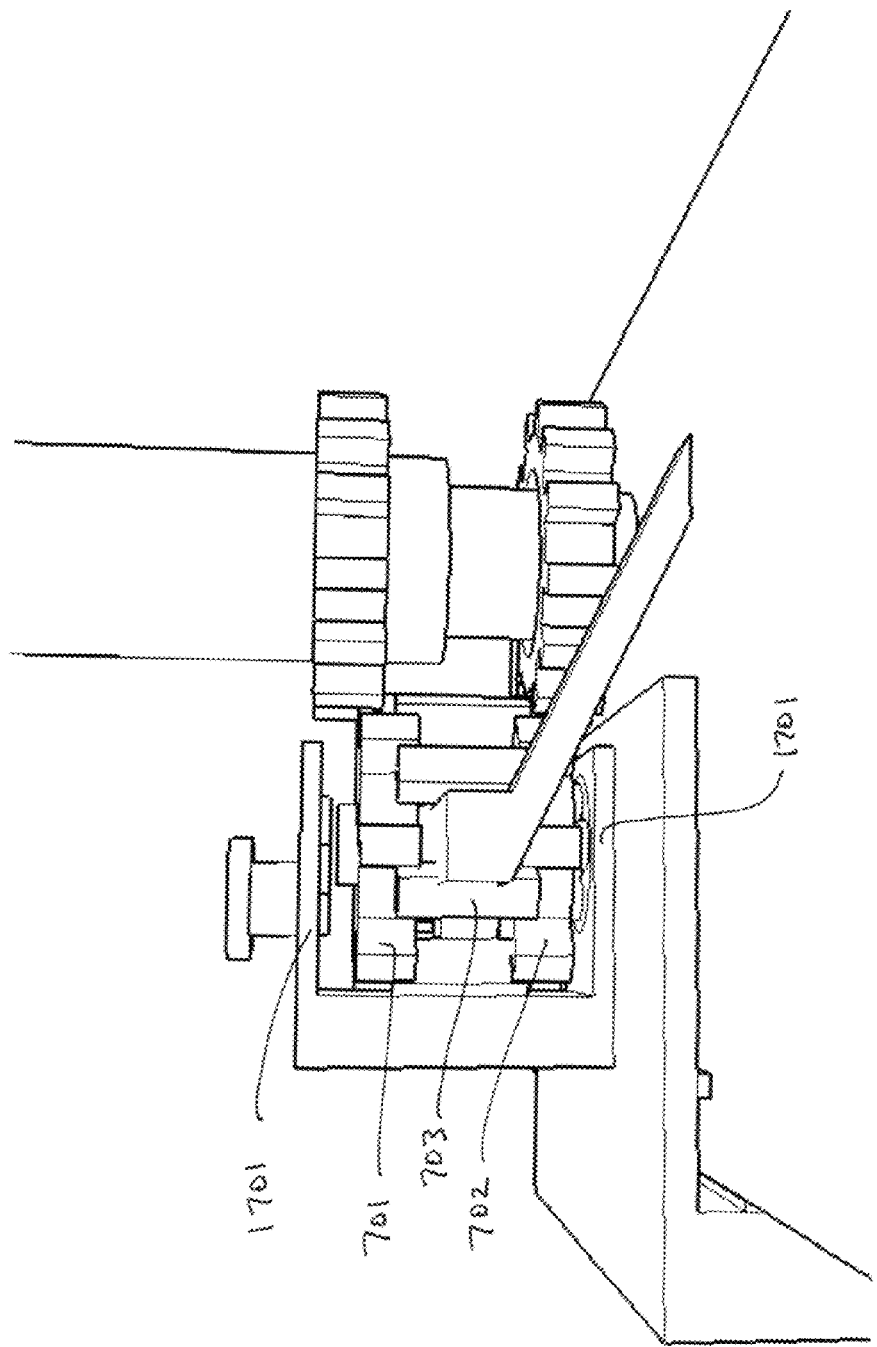
FIG. 20 is an illustration of a robotic controller utilizing two electromagnetic adjustment interfaces in accordance with an embodiment.

FIG. 20 is an illustration of a robotic controller utilizing two electromagnetic adjustment interfaces in accordance with an embodiment. FIG. 20 combines the systems described in FIG. 17 and FIG. 7 to better demonstrate how a robotic controller may be used to calibrate and/or adjust a multiplicity of mechanical position locking mechanisms utilizing a two electromagnetic adjustment interfaces (1701). The robotic controller's process is very similar to the process outlined in FIG. 18. However, instead of using an electromagnetic system to control an actuated braking mechanism, this configuration uses two static electromagnetic systems that are able to disengage the top and bottom final stage gears (701, 702) from a gear locking mechanism (703). These static electromagnetic systems are also able to adjust the rotation of the top and bottom final stage gears to effectively reposition the mechanical position locking mechanism.

After the robotic controller has properly aligned itself to an adjustment station and calculated the necessary adjustment to reposition the surface, it may activate both static electromagnetic interfaces. This activation induces a normal force on both the top (701) and bottom (702) final stage gears that releases them from the gear locking mechanism (703). Once the gear lock has been disengaged, the coils (1702) contained in each static electromagnetic interface may be individually activated to rotate the top and bottom final stage gears. After the final stage gears have been properly repositioned, the robotic controller may deactivate its static electromagnetic systems. This removes the normal force on the gears and allows the spring-loaded system to return them to a locked position.

The robotic controller adjustment process is much simpler in gear train systems that have inherent anti-back drive properties. These systems do not require the robotic controller to manipulate a braking mechanism during the adjustment process.

While particular embodiments and applications have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as set forth in the claims.

What is claimed is:

1. A system for controlling multiple solar surfaces comprising: a track for setting a pre-determined path; a first solar surface of the multiple solar surfaces having a coupling gear; a second solar surface of the multiple solar surfaces having a coupling gear; a first support structure adjacent to a first portion of the track and operable to adjust an orientation of the first solar surface, and a second support structure adjacent to a second portion of the track and operable to adjust an orientation of the second solar surface, each support structure having: a shaft coupled to the corresponding solar surface and a first input gear, the first input gear configured to receive a first input to rotate said solar surface in a first direction, the coupling of the shaft and said solar surface configured to enable said solar surface to rotate in a second direction; and an outer structure enveloping the shaft and coupled to a second input gear and an output gear, the output gear configured to engage the coupling gear of said solar surface, the second input gear configured to receive a second input to rotate said solar surface in the second direction; and a robot including a drive system configured to position said robot along said track, the robot configured to engage input gears of the first support structure to modify the orientation of the first solar surface when the robot is positioned near said first position of said track, and to engage input gears of the second support structure to modify the orientation of the second solar surface when the robot is positioned near said second position of said track.

2. The system of claim 1, wherein the robot further comprises:
a position sensing device configured to identify a position of the robot on the track;
an alignment module, disposed to interact with the input gears of said support structures.

3. The system of claim 2, wherein said alignment module interacts with the input gears using a mechanical interface.

4. The system of claim 3, wherein said alignment module includes alignment gears that couple to the input gears of the first support structure to modify the orientation of the first solar surface when said robot is positioned near the first position.

5. The system of claim 4, wherein said alignment module includes alignment gears that couple to the input gears of the second support structure to modify the orientation of the second solar surface when said robot is positioned near the second position.

6. The system of claim 2, wherein said alignment module includes an electromagnetic interface configured to engage the input gears of the first support structure.

7. The system of claim 6, wherein at the alignment module includes at least one first electromagnetic device configured to engage a second electromagnetic device of one of the input gears of the first support structure.

8. The system of claim 7, wherein said first electromagnetic device causes said second electromagnetic device to move and to modify the the orientation of said first solar surface.

9. The system of claim 1, wherein the first support structure includes a brake mechanism configured to resist movement of the first solar surface when the robot is not in the first position.

10. The system of claim 1, wherein said robot is positioned within said track.

11. The system of claim 1, wherein said track includes a cover, wherein said cover and track form an enclosed path and wherein said robot travels along said enclosed path.

12. The system of claim 1, wherein said robot includes:
a calibration sensor to detect an initial orientation of said first solar surface when positioned near said first position, the robot configured to engage the input gears of the first support structure to modify the orientation of the first solar surface based on the initial orientation.

13. The system of claim 1, wherein said robot includes:
a power charging interface configured to store power in an internal power storage device.

14. The system of claim 1, further comprising a second robot, wherein said first and second robots communicate with using a wireless communication system.

15. The system of claim 1, wherein said robot includes:
a calibration sensor to detect an initial orientation of said second solar surface when positioned near said second position, the robot configured to engage the input gears of the second support structure to modify the orientation of the second solar surface based on the initial orientation.

16. The system of claim 1, wherein said robot autonomously engages said first input gear of the first support structure and said second input gear of the second support structure.

17. A system for controlling multiple solar surfaces comprising: a track; a first solar surface of the multiple solar surfaces having a coupling mechanism; a second solar surface of the multiple solar surfaces having a coupling mechanism; a first support structure adjacent to a first portion of the track and operable to adjust an orientation of the first solar surface, and a second support structure adjacent to a second portion of the track and operable to adjust an orientation of the second solar surface, each support structure having: a shaft coupled to the corresponding solar surface and a first input mechanism, the first input mechanism configured to receive a first input to rotate said solar surface in a first direction, the coupling of the shaft and said solar surface configured to enable said solar surface to rotate in a second direction; and an outer structure enveloping the shaft and coupled to a second input mechanism and an output mechanism, the output mechanism configured to engage the coupling mechanism of said solar surface, the second input mechanism configured to receive a second input to rotate said solar surface in the second direction; and a robot including a drive system configured to position said robot along said track, the robot configured to engage input mechanism of the first support structure to modify the orientation of said first solar surface when the robot is positioned near said first position of said track, and to engage an input mechanism of the second support structure to modify the orientation of said second solar surface when the robot is positioned near said second position of said track.

18. The system of claim 17, wherein the robot further comprises:
   a position sensing device configured to identify a position of the robot on the track;
   an alignment module, disposed to interact with the input mechanisms of said support structures.

19. The system of claim 18, wherein said alignment module interacts with said input mechanisms using a mechanical interface.

20. The system of claim 18, wherein said alignment module interacts with said input mechanisms using an electromagnetic interface.

21. The system of claim 7, wherein said robot autonomously engages said first input mechanism of the first support structure and said second input mechanism of the second support structure.

* * * * *